US008481179B2

(12) United States Patent
Mori et al.

(10) Patent No.: US 8,481,179 B2
(45) Date of Patent: Jul. 9, 2013

(54) RARE EARTH MAGNET HAVING HIGH STRENGTH AND HIGH ELECTRICAL RESISTANCE

(75) Inventors: Katsuhiko Mori, Naka-gun (JP); Ryoji Nakayama, Naka-gun (JP); Muneaki Watanabe, Naka-gun (JP); Koichiro Morimoto, Niigata (JP); Tetsurou Tayu, Yokosuka (JP); Yoshio Kawashita, Yokosuka (JP); Makoto Kano, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 153 days.

(21) Appl. No.: 12/929,487

(22) Filed: Jan. 28, 2011

(65) Prior Publication Data

US 2011/0128106 A1 Jun. 2, 2011

Related U.S. Application Data

(62) Division of application No. 11/449,874, filed on Jun. 9, 2006, now Pat. No. 7,919,200.

(30) Foreign Application Priority Data

Jun. 10, 2005 (JP) ................................ 2005-170475
Jun. 10, 2005 (JP) ................................ 2005-170476
Jun. 10, 2005 (JP) ................................ 2005-170477

(51) Int. Cl.
*B32B 15/04* (2006.01)

(52) U.S. Cl.
USPC ........................................................ 428/693.1

(58) Field of Classification Search
None
See application file for complete search history.

(56) References Cited

U.S. PATENT DOCUMENTS 5,228,930 A * 7/1993 Nakayama et al. ........... 148/302
6,136,100 A 10/2000 Panchanathan ............... 148/302
2002/0109571 A1 8/2002 Fujiwara et al. .............. 336/178
2002/0112785 A1 * 8/2002 Sekine et al. ................ 148/302
2004/0000359 A1 * 1/2004 Tayu et al. .................... 148/302

FOREIGN PATENT DOCUMENTS

DE 102005035446 A1 3/2006
EP 0921533 A1 6/1999
EP 1187148 A1 3/2002
JP 3-129703 6/1991

(Continued)

OTHER PUBLICATIONS

Japanese Office Action dated Dec. 21, 2009 (with its English translation).

(Continued)

*Primary Examiner* — Holly Rickman
*Assistant Examiner* — Lisa Chau
(74) *Attorney, Agent, or Firm* — Kratz, Quintos & Hanson, LLP

(57) ABSTRACT

This rare earth magnet having high strength and high electrical resistance has a structure including an R—Fe—B-based rare earth magnet particles 18 which are enclosed with a high strength and high electrical resistance composite layer 12. The high strength and high electrical resistance composite layer 12 is constituted from a glass-based layer 16 that has a structure comprising a glass phase or R oxide particles 13 dispersed in glass phase, and R oxide particle-based mixture layers 17 that are formed on both sides of the glass-based layer 16 and contain an R-rich alloy phase 14 which contains 50 atomic % or more of R in the grain boundary of the R oxide particles.

16 Claims, 4 Drawing Sheets

FOREIGN PATENT DOCUMENTS

| | | | | |
|---|---|---|---|---|
| JP | 2576672 | | | 11/1996 |
| JP | 9-7868 | | | 1/1997 |
| JP | 2576672 | | | 1/1997 |
| JP | 2001-68317 | | | 3/2001 |
| JP | 2002-64010 | | | 2/2002 |
| JP | 2004-31780 | | | 1/2004 |
| JP | 2004-31781 | | | 1/2004 |
| JP | 2005-93350 | | | 4/2005 |
| JP | 2005-142374 | | | 6/2005 |
| JP | 2005142374 | A | * | 6/2005 |

OTHER PUBLICATIONS

Partial European Search Report dated Mar. 24, 2010.
European Search Report dated May 31, 2010.

* cited by examiner

RARE EARTH MAGNET HAVING HIGH STRENGTH AND HIGH ELECTRICAL RESISTANCE

This application is a Divisional Application of prior application Ser. No. 11/449,874, filed on Jun. 9, 2006 now U.S. Pat. No. 7,919,200, which is hereby incorporated by reference.

BACKGROUND OF THE INVENTION

1. Field of the Invention

The present invention relates to a rare earth magnet having high strength and high electrical resistance.

Priority is claimed on Japanese Patent Application Nos. 2005-170475, filed on Jun. 10, 2005, 2005-170476, filed on Jun. 10, 2005, and 2005-170477, filed on Jun. 10, 2005, the contents of which are incorporated herein by reference.

2. Description of Related Art

An R—Fe—B-based rare earth magnet, where R represents one or more kind of rare earth element including Y (this applies throughout this application), is known to have such a composition that contains R, Fe and B as basic components with Co and/or M (M represents one or more kind selected from among Ga, Zr, Nb, Mo, Hf, Ta, W, Ni, Al, Ti, V, Cu, Cr, Ge, C and Si; this applies throughout this application) added as required, specifically, 5 to 20% of R, 0 to 50% of Co, 3 to 20% of B and 0 to 5% of M are contained (% refers to atomic %, which applies throughout this application), with the balance consisting of Fe and inevitable impurities.

It is known that the R—Fe—B-based rare earth magnet can be manufactured by subjecting an R—Fe—B-based rare earth magnet powder to hot pressing, hot isostatic pressing or the like. One of methods of manufacturing the R—Fe—B-based rare earth magnet powder is such that an R—Fe—B-based rare earth magnet alloy material that has been subjected to hydrogen absorption treatment is heated to a temperature in a range from 500 to 1000° C. and kept at this temperature in hydrogen atmosphere of pressure from 10 to 1000 kPa so as to carry out hydrogen absorption and decomposition treatment in which the R—Fe—B-based rare earth magnet alloy material is caused to absorb hydrogen and decompose through phase transition, followed by dehydrogenation of the R—Fe—B-based rare earth magnet alloy material by holding the R—Fe—B-based rare earth magnet alloy material in vacuum at a temperature in a range from 500 to 1000° C. It is known that the R—Fe—B-based rare earth magnet powder thus obtained has recrystallization texture consisting of adjoining recrystallized grains that are constituted from $R_2Fe_{14}B$ type intermetallic compound phase that has substantially tetragonal structure as the main phase, and the recrystallization texture has the fundamental structure of magnetically anisotropic HDDR magnetic powder in which the fundamental structure has such a constitution that 50% by volume or more of the recrystallized grains are those which have such a shape as the ratio b/a of the least grain size a and the largest grain size b of the recrystallized grains is less than 2, and average size of the recrystallized grains is in a range from 0.05 to 5 μm (Japanese Patent No. 2,376,642).

In recent years, automobiles are employing increasing numbers of electrically powered devices, while great efforts are being made in the development of electric vehicles. In line with these trends, research and development activities have been increasing for the development of compact and high performance electronic devices and motors based on permanent magnet, for onboard applications. Improvement in the performance of the compact and high performance electronic devices and motors based on permanent magnet inevitably requires it to use the R—Fe—B-based rare earth magnet that has high magnetic anisotropy. However, the ordinary R—Fe—B-based rare earth magnet is a metallic magnet and therefore has low electrical resistance which, when used in a motor, causes a large eddy current loss that decreases the efficiency of the motor through heat generation from the magnet and other factors. To avoid this problem, R—Fe—B-based rare earth magnets that have high electrical resistance have been developed. It has been proposed to make one of these R—Fe—B-based rare earth magnets that have high electrical resistance by forming an R oxide layer in the grain boundary of R—Fe—B-based rare earth magnet particles so that the R—Fe—B-based rare earth magnet particles are enclosed with the R oxide layer to make a structure (Japanese Unexamined Patent Application, First Publication No. 2004-31780 and Japanese Unexamined Patent Application, First Publication No. 2004-31781).

However, since the rare earth magnet of the prior art that has high electrical resistance has a structure such that the R oxide layer exists in the grain boundary of the R—Fe—B-based rare earth magnet particles, bonding strength between the R—Fe—B-based rare earth magnet particles is weak, and therefore, the rare earth magnet of the prior art that has high electrical resistance has the problem of insufficient mechanical strength.

SUMMARY OF THE INVENTION

With the background described above, the present inventors conducted a research to make a rare earth magnet that has further higher strength and higher electrical resistance. It was found that satisfactory magnetic anisotropy and coercivity comparable to those of the conventional rare earth magnet and further higher strength and higher electrical resistance can be achieved with a rare earth magnet that is formed by stacking a composite layer which has high strength and high electrical resistance (hereinafter referred to as high strength and high electrical resistance composite layer) and an R—Fe—B-based rare earth magnet layer, wherein the high strength and high electrical resistance composite layer comprises a glass-based layer having a glass phase or a structure of R oxide particles dispersed in glass phase, and an R oxide particle-based mixture layers that are formed on both sides of the glass-based layer and contain an R-rich alloy phase which contains 50 atomic % or more of R in the grain boundary of the R oxide particles.

The present invention is based on the results of the research described above, and is characterized as:

(1) a rare earth magnet having high strength and high electrical resistance formed by stacking the high strength and high electrical resistance composite layer and the R—Fe—B-based rare earth magnet layer, wherein the high strength and high electrical resistance composite layer comprises a glass-based layer having a glass phase or a structure of R oxide particles dispersed in a glass phase, and the R oxide particle-based mixture layers that are formed on both sides of the glass-based layer and which contain an R-rich alloy phase which contains 50 atomic % or more of R in the grain boundary of the R oxide particles.

According to the above invention, the glass-based layer in the high strength and high electrical resistance composite layer improves the insulation performance and increases the strength of bonding with the R oxide particle-based mixture layer. In addition, the R oxide particle-based mixture layer prevents the R—Fe—B-based rare earth magnet layer and the glass-based layer from reacting with each other, so that the magnetic property is prevented from decreasing and bonding strength is increased, thereby making rare earth magnet having high strength and high electrical resistance that is excellent also in magnetic property. Presence of the high strength and high electrical resistance composite layer enables the rare earth magnet having high strength and high electrical resistance of the present invention to greatly improve the electrical resistance inside of the magnet so as to reduce the eddy current generated therein and thereby suppress the heat generation from the magnet significantly.

The present invention may also have such a constitution as:

(2) the rare earth magnet having high strength and high electrical resistance as described in (1), wherein the high strength and high electrical resistance composite layer further comprises an R oxide layer formed on the surface of the R oxide particle-based mixture layer opposite to the surface thereof that makes contact with the glass-based layer, (3) the rare earth magnet having high strength and high electrical resistance as described in (1), wherein the R—Fe—B-based rare earth magnet layer has a composition such as 5 to 20% of R and 3 to 20% of B (hereinafter % refers to atomic %), with the balance consisting of Fe and inevitable impurities, (4) the rare earth magnet having high strength and high electrical resistance as described in (1), wherein the R—Fe—B-based rare earth magnet layer has such a composition as 5 to 20% of R, 3 to 20% of B, and 0.001 to 5% of M (M represents one or more selected from the group consisting of Ga, Zr, Nb, Mo, Hf, Ta, W, Ni, Al, Ti, V, Cu, Cr, Ge, C, and Si), with the balance consisting of Fe and inevitable impurities, (5) the rare earth magnet having high strength and high electrical resistance as described in (1), wherein the R—Fe—B-based rare earth magnet layer has a composition such as 5 to 20% of R, 0.1 to 50% of Co, and 3 to 20% of B, with the balance consisting of Fe and inevitable impurities, (6) the rare earth magnet having high strength and high electrical resistance as described in (1), wherein the R—Fe—B-based rare earth magnet layer has a composition such as 5 to 20% of R, 0.1 to 50% of Co, 3 to 20% of B, and 0.001 to 5% of M, with the balance consisting of Fe and inevitable impurities, or (7) the R—Fe—B-based rare earth magnet having high strength and high electrical resistance wherein the R—Fe—B-based rare earth magnet layer as described in (1), (2), (3), (4), (5) or (6) is a magnetically anisotropic HDDR magnetic layer having a recrystallization texture comprising adjoining recrystallized grains containing an $R_2Fe_{14}B$ type intermetallic compound phase having a substantially tetragonal structure as a main phase, while the recrystallization texture has a fundamental structure having a constitution such that 50% by volume or more of the recrystallized grains have a shape such that a ratio b/a of the minimum grain size a and the maximum grain size b of the recrystallized grain is less than 2, and the average size of the recrystallized grains is in a range from 0.05 to 5 μm.

The present inventors also conducted a research to make a rare earth magnet having further higher strength and higher electrical resistance. It was found that satisfactory magnetic anisotropy and coercivity comparable to those of the conventional rare earth magnet and further higher strength and higher electrical resistance can be achieved with a rare earth magnet that has a structure such that the R—Fe—B-based rare earth magnet particles are enclosed with the composite layer having high strength and high electrical resistance, wherein the high strength and high electrical resistance composite layer comprises a glass-based layer having a glass phase or a structure of R oxide particles dispersed in glass phase, and R oxide particle-based mixture layers that are formed on both sides of the glass-based layer and contain an R-rich alloy phase which contains 50 atomic % or more of R in the grain boundary of the R oxide particles.

The present invention is based on the results of the research described above, and is characterized as:

(8) a rare earth magnet having high strength and high electrical resistance having a structure such that the R—Fe—B-based rare earth magnet particles are enclosed within the high strength and high electrical resistance composite layer, wherein the high strength and high electrical resistance composite layer comprises a glass-based layer having a glass phase or a structure of R oxide particles dispersed in a glass phase, and R oxide particle based mixture layers that are formed on both sides of the glass-based layer and which contain an R-rich alloy phase which containing 50 atomic % or more of R in the grain boundary of the R oxide particles.

According to the present invention, the glass-based layer provided in the high strength and high electrical resistance composite layer further improves the insulation performance and increases the strength of bonding with the R oxide particle-based mixture layer. In addition, the R oxide particle-based mixture layers prevent the R—Fe—B-based rare earth magnet particles and the glass-based layer from reacting with each other, so that the magnetic property is prevented from decreasing and bonding strength is increased, thereby making rare earth magnet having high strength and high electrical resistance that is excellent also in magnetic property. Presence of the high strength and high electrical resistance composite layer enables the rare earth magnet having high strength and high electrical resistance of the present invention to greatly improve the electrical resistance inside of the magnet so as reduce the eddy current generated therein and thereby suppress the heat generation from the magnet significantly.

The present invention may also have such a constitution as:

(9) the rare earth magnet having high strength and high electrical resistance as described in (8), wherein the high strength and high electrical resistance composite layer further comprises an R oxide layer formed on the surface of the R oxide particle-based mixture layer opposite to the surface thereof that makes contact with the glass-based layer,

(10) the rare earth magnet having high strength and high electrical resistance as described in (8), wherein the R—Fe—B-based rare earth magnet particles are particles of rare earth magnet that have a composition such as 5 to 20% of R and 3 to 20% of B, with the balance consisting of Fe and inevitable impurities,

(11) the rare earth magnet having high strength and high electrical resistance as described in (8), wherein the R—Fe—B-based rare earth magnet particles are particles of rare earth magnet that have a composition such as 5 to 20% of R, 3 to 20% of B, and 0.001 to 5% of M, with the balance consisting of Fe and inevitable impurities,

(12) the rare earth magnet having high strength and high electrical resistance as described in (8), wherein the R—Fe—B-based rare earth magnet particles are particles of rare earth magnet that have a composition such as 5 to 20% of R, 0.1 to 50% of Co, and 3 to 20% of B, with the balance consisting of Fe and inevitable impurities,

(13) the rare earth magnet having high strength and high electrical resistance as described in (8), wherein the R—Fe—B-based rare earth magnet particles are particles of rare earth magnet that have a composition such as 5 to 20% of R, 0.1 to 50% of Co, 3 to 20% of B, and 0.001 to 5% of M, with the balance consisting of Fe and inevitable impurities, or

(14) the R—Fe—B-based rare earth magnet having high strength and high electrical resistance, wherein the R—Fe—B-based rare earth magnet particles as described in (8), (9), (10), (11), (12) or (13) are particles of magnetically anisotropic HDDR magnet having a recrystallization texture comprising adjoining recrystallized grains contains $R_2Fe_{14}B$ type intermetallic compound phase of substantially tetragonal structure as the main phase, while the recrystallization texture has a fundamental structure having such a constitution that 50% by volume or more of the recrystallized grains are those which have such a shape as the ratio b/a of the least grain size a and the largest grain size b of the recrystallized grains is less than 2, and average size of the recrystallized grains is in a range from 0.05 to 5 μm.

The present inventors also conducted a research to make a rare earth magnet having further higher strength and higher electrical resistance. It was found that higher strength and higher electrical resistance than those of a conventional rare earth magnet of high electrical resistance, which have such a constitution as an R oxide layer is formed in the grain boundary of the R—Fe—B-based rare earth magnet particles so that the R—Fe—B-based rare earth magnet particles are enclosed with the R oxide layer, can be achieved with a rare earth magnet formed by stacking a composite layer having high strength and high electrical resistance (hereinafter referred to as the high strength and high electrical resistance composite layer) constituted from two oxide layers of R(R represents one or more kind of rare earth elements including Y; this applies throughout this application) that sandwich one glass layer and an R—Fe—B-based rare earth magnet layer, wherein the high strength and high electrical resistance composite layer is provided between the R—Fe—B-based rare earth magnet layers.

The present invention is based on the results of the research described above, and is characterized as:

(15) a rare earth magnet having high strength and high electrical resistance comprising: a high strength and high electrical resistance composite layer that is formed by stacking R oxide layers on both sides of a glass layer and an R—Fe—B-based rare earth magnet layer to be stacked, wherein the high strength and high electrical resistance composite layer is provided between the R—Fe—B-based rare earth magnet layer.

According to the present invention, the glass layer provided in the high strength and high electrical resistance composite layer increases the bonding strength between the R oxide layers, thus resulting in higher mechanical strength of the rare earth magnet, higher insulation and high strength and high electrical resistance. In addition, presence of the high strength and high electrical resistance composite layer enables the rare earth magnet having high strength and high electrical resistance of the present invention to greatly improve the electrical resistance inside of the magnet so as reduce the eddy current generated therein and thereby suppress the heat generation from the magnet significantly.

The present invention may also have such a constitution as:

(16) the rare earth magnet having high strength and high electrical resistance as described in (15) wherein the R—Fe—B-based rare earth magnet layer has such a composition as 5 to 20% of R and 3 to 20% of B are contained, with the balance consisting of Fe and inevitable impurities,

(17) the rare earth magnet having high strength and high electrical resistance as described in (15) wherein the R—Fe—B-based rare earth magnet layer has such a composition as 5 to 20% of R, 3 to 20% of B, and 0.001 to 5% of M are contained, with the balance consisting of Fe and inevitable impurities,

(18) the rare earth magnet having high strength and high electrical resistance as described in (15) wherein the R—Fe—B-based rare earth magnet layer has such a composition as 5 to 20% of R, 0.1 to 50% of Co, and 3 to 20% of B are contained, with the balance consisting of Fe and inevitable impurities,

(19) the rare earth magnet having high strength and high electrical resistance as described in (15) wherein the R—Fe—B-based rare earth magnet layer has such a composition as 5 to 20% of R, 0.1 to 50% of Co, 3 to 20% of B, and 0.001 to 5% of M are contained, with the balance consisting of Fe and inevitable impurities, or

(20) the R—Fe—B-based rare earth magnet having high strength and high electrical resistance wherein the R—Fe—B-based rare earth magnet layer as described in (15), (16), (17), (18) or (19) is a layer of magnetically anisotropic HDDR magnet having a recrystallization texture comprising adjoining recrystallized grains contains $R_2Fe_{14}B$ type intermetallic compound phase of substantially tetragonal structure as the main phase, while the recrystallization texture has a fundamental structure having such a constitution that 50% by volume or more of the recrystallized grains are those which have such a shape as the ratio b/a of the least grain size a and the largest grain size b of the recrystallized grain is less than 2, and average size of the recrystallized grains is in a range from 0.05 to 5 μm.

The present inventors further conducted a research to make a rare earth magnet having further higher strength and higher electrical resistance. It was found that satisfactory magnetic anisotropy and coercivity comparable to those of the conventional rare earth magnet and further higher strength and higher electrical resistance can be achieved with a rare earth magnet having a structure having the R—Fe—B-based rare earth magnet particles which are enclosed with the high strength and high electrical resistance composite layer formed by stacking the R oxide layers on both sides of the glass layer in contact therewith.

The present invention is based on the results of the research described above, and is characterized as:

(21) a rare earth magnet having high strength and high electrical resistance having a structure such that the R—Fe—B-based rare earth magnet particles are enclosed with a high strength and high electrical resistance composite layer formed by stacking R oxide layers on both sides of a glass layer in contact therewith.

The rare earth magnet having high strength and high electrical resistance of the present invention, comprises the R—Fe—B-based rare earth magnet particles and the high strength and high electrical resistance composite layer having the R oxide layer formed in the grain boundaries of the R—Fe—B-based rare earth magnet particles and the glass layer, in which the R—Fe—B-based rare earth magnet particles have a structure that are enclosed with the high strength and high electrical resistance composite layer that is provided in the grain boundary of the R—Fe—B-based rare earth magnet particles. Presence of the glass layer in the high strength and high electrical resistance composite layer enables bonding strength between the R oxide layer to increase, thus resulting in greatly increased mechanical strength of the rare earth magnet, higher insulation and high strength and high electrical resistance. In addition, presence of the high strength and high electrical resistance composite layer enables the rare earth magnet having high strength and high electrical resistance of the present invention to greatly improve the electrical resistance inside of the magnet so as reduce the eddy current generated therein and thereby suppress the heat generation from the magnet significantly.

The present invention may also have such a constitution as:

(22) the rare earth magnet having high strength and high electrical resistance as described in (21) wherein the R—Fe—B-based rare earth magnet particles have such a composition as 5 to 20% of R and 3 to 20% of B are contained, with the balance consisting of Fe and inevitable impurities,

(23) the rare earth magnet having high strength and high electrical resistance as described in (21) wherein the R—Fe—B-based rare earth magnet particles have such a composition as 5 to 20% of R, 3 to 20% of B, and 0.001 to 5% of M are contained, with the balance consisting of Fe and inevitable impurities,

(24) the rare earth magnet having high strength and high electrical resistance as described in (21) wherein the R—Fe—B-based rare earth magnet particles have such a composition as 5 to 20% of R, 0.1 to 50% of Co, and 3 to 20% of B are contained, with the balance consisting of Fe and inevitable impurities,

(25) the rare earth magnet having high strength and high electrical resistance as described in (21) wherein the R—Fe—B-based rare earth magnet particles have such a composition as 5 to 20% of R, 0.1 to 50% of Co, 3 to 20% of B, and 0.001 to 5% of M are contained, with the balance consisting of Fe and inevitable impurities, while

(26) the R—Fe—B-based rare earth magnet having high strength and high electrical resistance wherein the R—Fe—B-based rare earth magnet particles as described in (21), (22), (23), (24) or (25) are particles of magnetically anisotropic HDDR magnet having a recrystallization texture comprising adjoining recrystallized grains contains $R_2Fe_{14}B$ type intermetallic compound phase of substantially tetragonal structure as the main phase, while the recrystallization texture has a fundamental structure having such a constitution that 50% by volume or more of the recrystallized grains are those which have such a shape as the ratio b/a of the least grain size a and the largest grain size b of the recrystallized grain is less than 2, and average size of the recrystallized grains is in a range from 0.05 to 5 μm.

The rare earth magnet having high strength and high electrical resistance of the present invention is capable of enduring severe vibration because of the high strength, and makes it possible to improve the performance of a permanent magnet motor that incorporates the rare earth magnet having high strength and high electrical resistance.

DETAILED DESCRIPTION OF THE INVENTION

The rare earth magnet having high strength and high electrical resistance of the present invention will be described with reference to the accompanying drawings.

Figure 1:
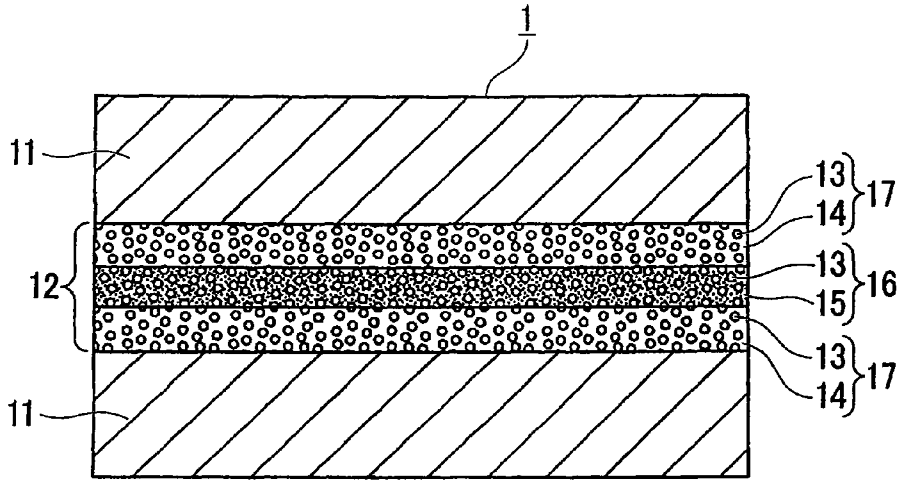
FIG. 1 is a schematic diagram showing the structure of a rare earth magnet of the present invention.

FIG. 1 is a schematic diagram showing a cross section of the rare earth magnet having high strength and high electrical resistance described in (1). In FIG. 1, a rare earth magnet 1 comprises an R—Fe—B-based rare earth magnet layer 11, a high strength and high electrical resistance composite layer 12, R oxide particles 13, an R-rich alloy phase 14, a glass phase 15, a glass-based layer 16, and an R oxide particle-based mixture layer 17. The high strength and high electrical resistance composite layer 12 has a structure such that the R oxide particle-based mixture layers 17 are formed on both sides of the glass-based layer 16 in contact therewith, while the high strength and high electrical resistance composite layer 12 is provided between the R—Fe—B-based rare earth magnet layers 11. The glass-based layer 16 has a structure consisting of a glass phase only or the R oxide particles 13 dispersed in the glass phase 15, and the R oxide particle-based mixture layer 17 contains the R-rich alloy phase 14 which contains 50 atomic % or more of R in the grain boundary of the R oxide particles 13.

Because of such a stacking structure, the high strength and high electrical resistance composite layer 12 has further improved insulation property due to the glass-based layer 16 and increased bonding strength with the R oxide particle-based mixture layer 17. The R oxide particle-based mixture layer 17 prevents the R—Fe—B-based rare earth magnet layer 11 and the glass-based layer 16 from reacting with each other, prevents the magnetic property from decreasing and increases the bonding strength, thereby making the rare earth magnet having high strength and high electrical resistance that is excellent also in magnetic property. Presence of the high strength and high electrical resistance composite layer 12 enables the rare earth magnet 1 having high strength and high electrical resistance of the present invention to greatly improve the electrical resistance inside of the magnet 1 so as reduce the eddy current generated therein and thereby suppress the heat generation from the magnet significantly.

While the rare earth magnet having a constitution of one high strength and high electrical resistance composite layer 12 being provided between two R—Fe—B-based rare earth magnet layers 11 is shown in FIG. 1 to make the invention easier to understand, the rare earth magnet having high strength and high electrical resistance of the present invention may also have such a constitution as n pieces (n is a positive integer) of high strength and high electrical resistance composite layers 12 are provided between n+1 pieces of R—Fe—B-based rare earth magnet layers 11 alternately.

The high strength and high electrical resistance composite layer 12 may also have an R oxide layer formed on the surface of the R oxide particle-based mixture layer 17 opposite to the surface that makes contact with the glass-based layer 16.

Figure 2:
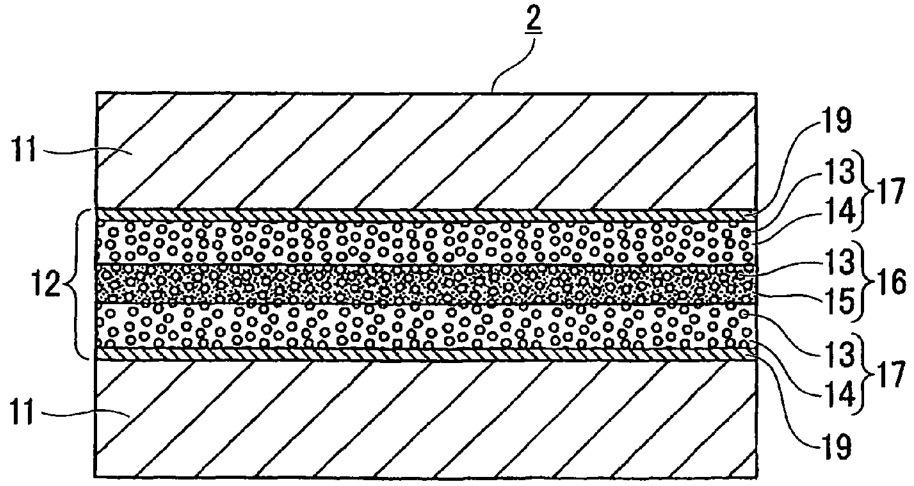
FIG. 2 is a schematic diagram showing the structure of a rare earth magnet of the present invention.

FIG. 2 is a schematic sectional view of the rare earth magnet having high strength and high electrical resistance in the constitution that the high strength and high electrical resistance composite layer 12 has the R oxide layer, namely the rare earth magnet having high strength and high electrical resistance described in (2).

In FIG. 2, the rare earth magnet 2 comprises the R—Fe—B-based rare earth magnet layer 11, the high strength and high electrical resistance composite layer 12, the R oxide particles 13, the R-rich alloy phase 14, the glass phase 15, the glass-based layer 16, the R oxide particle-based mixture layer 17, and an R oxide layer 19.

As shown in FIG. 2, the high strength and high electrical resistance composite layer 12 has a structure such that the R oxide particle-based mixture layers 17 are stacked on both sides of the glass-based layer 16 in contact therewith, and has the R oxide layer 19 formed on the surface of the R oxide particle-based mixture layer 17 opposite to the surface thereof that makes contact with the glass-based layer 16, while the high strength and high electrical resistance composite layer 12 is provided between the R—Fe—B-based rare earth magnet layers 11.

The glass-based layer 16 has a structure consisting of glass phase only or the R oxide particles 13 dispersed in the glass phase 15, and the R oxide particle-based mixture layer 17 contains an R-rich alloy phase which contains 50 atomic % or more R in the grain boundary of the R oxide particles, and the R oxide layer 19 is composed of oxide of R.

Because of such a stacking structure, the high strength and high electrical resistance composite layer 12 has further improved insulation property due to the glass-based layer 16 and the R oxide layer 19 and increased bonding strength with the R oxide particle-based mixture layer 17. The R oxide particle-based mixture layer 17 and the R oxide layer 19 prevent the R—Fe—B-based rare earth magnet layer 11 and the glass-based layer 16 from reacting with each other, prevent the magnetic property from decreasing and increase the bonding strength. Presence of the high strength and high electrical resistance composite layer 12 increases the strength of entire magnet so as to be capable of enduring severe vibration, and enables the rare earth magnet to greatly improve the electrical resistance of the inside of the magnet so as to reduce the eddy current generated therein, and thereby suppress the heat generation from the magnet significantly, while providing excellent magnetic property.

While the rare earth magnet having a constitution of one high strength and high electrical resistance composite layer 12 being provided between two R—Fe—B-based rare earth magnet layers 11 is shown in FIG. 2 to make the invention easier to understand, the rare earth magnet having high strength and high electrical resistance of the present invention may have a constitution such that n pieces (n is a positive integer) of high strength and high electrical resistance composite layers 12 are provided between n+1 R—Fe—B-based rare earth magnet layers 11 alternately.

Figure 3:
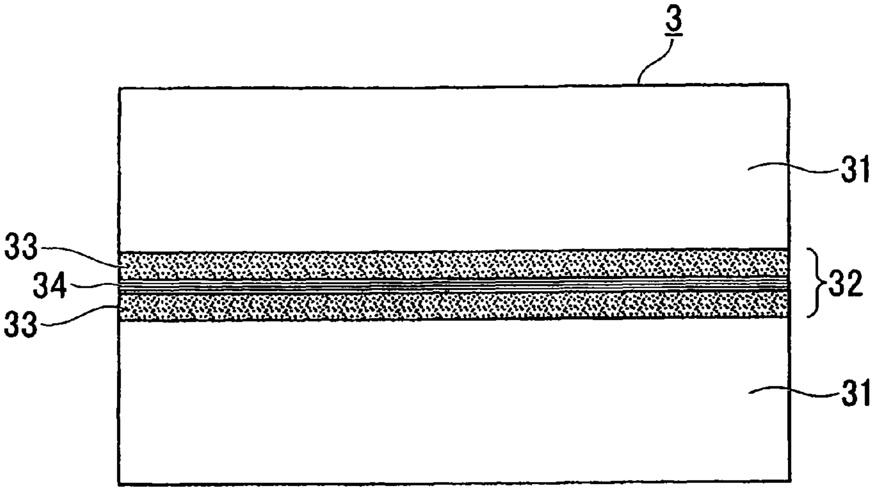
FIG. 3 is a schematic diagram showing the structure of a rare earth magnet of the present invention.

FIG. 3 is a schematic sectional view of the rare earth magnet having high strength and high electrical resistance described in (15). In FIG. 3, the rare earth magnet 3 comprises an R—Fe—B-based rare earth magnet layer 31, a high strength and high electrical resistance composite layer 32, an R oxide layer 33, and a glass layer 34. The high strength and high electrical resistance composite layer 32 has a structure such that the R oxide layers 3 are stacked on both sides of the glass layer 34 in contact therewith, and the high strength and high electrical resistance composite layer 32 is provided between the R—Fe—B-based rare earth magnet layers 31.

Because the high strength and high electrical resistance composite layer 32 has a stacking structure as described above, bonding between the R oxide layers 33 is made firmer by the glass layer 34 so that strength of the rare earth magnet is greatly improved while the insulation property is improved and high strength and high electrical resistance are achieved. Also the presence of the high strength and high electrical resistance composite layer 32 enables the rare earth magnet having high strength and high electrical resistance of the present invention to greatly improve the electrical resistance inside of the magnet so as to reduce the eddy current generated therein and thereby suppress the heat generation from the magnet significantly.

While the rare earth magnet having a constitution such that one high strength and high electrical resistance composite layer 32 is provided between two R—Fe—B-based rare earth magnet layers 31 in FIG. 3 to make the invention easier to understand, the rare earth magnet having high strength and high electrical resistance of the present invention may have a constitution such that n pieces (n is a positive integer) of high strength and high electrical resistance composite layer 32 are provided between n+1 R—Fe—B-based rare earth magnet layers 31 alternately.

The R—Fe—B-based rare earth magnet layers 11 and 31 may have a composition such that 5 to 20% of R and 3 to 20% of B are contained with the balance consisting of Fe and inevitable impurities, or a composition such that 5 to 20% of R, 3 to 20% of B, and 0.001 to 5% of M are contained with the balance consisting of Fe and inevitable impurities, or a composition such that 5 to 20% of R, 0.1 to 50% of Co, and 3 to 20% of B are contained with the balance consisting of Fe and inevitable impurities, or a composition such that 5 to 20% of R, 0.1 to 50% of Co, 3 to 20% of B, and 0.001 to 5% of M are contained with the balance consisting of Fe and inevitable impurities.

FIG. 1 shows the high strength and high electrical resistance composite layer 12 in a structure such that the R oxide particle-based mixture layers 17 are stacked on both sides of the glass-based layer 16 in contact therewith, and the high strength and high electrical resistance composite layer 12 is provided between the R—Fe—B-based rare earth magnet layers 11, 11. It is preferable that the glass-based layer 16 is formed by softening and fusing the glass powder to form a glass phase or causing the R oxide particles to disperse in the softened glass phase during formation by hot pressing, and the R oxide particle-based mixture layer 17 is formed by causing the R-rich alloy phase 14 containing 50 atomic % or more of R contained in the R—Fe—B-based rare earth magnet layer 11 to enter the grain boundary between the R oxide particles 13 during formation by hot pressing.

While R of the R oxide particles 13 that constitute the high strength and high electrical resistance composite layer 12 may or may not be the same R contained in the R—Fe—B-based rare earth magnet layer 11, it is preferably one or more kind selected from among Y, Gd, Tb, Dy, Ho, Er, Tm, Yb and Lu, and is more preferably Tb and/or Dy.

FIG. 2 shows the high strength and high electrical resistance composite layer 12 which is formed by stacking the R oxide particle-based mixture layers 17 on both sides of the glass-based layer 16 in contact therewith and further has the R oxide layer 19 formed on the surface of the R oxide particle-based mixture layer 17 opposite to the surface that makes contact with the glass-based layer 16, while the high strength and high electrical resistance composite layer 12 is provided between the R—Fe—B-based rare earth magnet layers 11, 11. It is preferable that the glass-based layer 16 is formed by softening and fusing the glass powder to form a glass phase or causing the R oxide particles to disperse in the softened glass phase during formation by hot pressing, and the R oxide particle-based mixture layer 17 is formed by causing the R-rich alloy phase 14 containing 50 atomic % or more of R contained in the R—Fe—B-based rare earth magnet layer 11, to enter the grain boundary of the R oxide particles 13 during formation by hot pressing.

Thus the R oxide particle-based mixture layer 17 is formed as the R-rich alloy phase 14 which contains 50 atomic % or more R contained in the R—Fe—B-based rare earth magnet layer 11 enters through a portion of the R oxide layer 19 where it is cracked or peeled off into the grain boundary of the R oxide particles 13 during formation by hot pressing or the like.

While R of the R oxide particles 13 and of the R oxide layer 19 that constitute the high strength and high electrical resistance composite layer 12 may or may not be the same R contained in the R—Fe—B-based rare earth magnet layer 11, it is preferably one or more kind selected from the group consisting of Y, Gd, Tb, Dy, Ho, Er, Tm, Yb, and Lu, and is more preferably Tb and/or Dy. Also R of the R-rich alloy phase 14 is preferably the same as the R contained in the R—Fe—B-based rare earth magnet layer 11, but may be different from the R contained in the R—Fe—B-based rare earth magnet layer 11.

In FIG. 3, while R of the R oxide layer 33 that constitutes the high strength and high electrical resistance composite layer 32 may or may not be the same as the R contained in the R—Fe—B-based rare earth magnet layer 31, it is preferably one or more kind selected from among Y, Gd, Tb, Dy, Ho, Er, Tm, Yb, and Lu, and is more preferably Tb and/or Dy.

The R—Fe—B-based rare earth magnet layers 11 and 31 are more preferably magnetically anisotropic HDDR magnetic layers having a recrystallization texture consisting of adjoining recrystallized grains that are constituted from an $R_2Fe_{14}B$ type intermetallic compound phase of a substantially tetragonal structure as the main phase, while the recrystallization texture has a fundamental structure containing 50% by volume or more of the recrystallized grains having a shape such that the ratio b/a of the minimum grain size a and the maximum grain size b of the recrystallized grain is less than 2, and the average size of the recrystallized grains is in a range from 0.05 to 5 μm.

An example of manufacturing the rare earth magnet having high strength and high electrical resistance of the present invention shown in FIG. 1 is as follows.

An R—Fe—B-based rare earth magnet powder green compact layer is formed from an ordinary R—Fe—B-based rare earth magnet powder that has high magnetic anisotropy by a forming process in magnetic field. An R oxide particle slurry is applied onto the upper and lower surfaces or the upper surface of the R—Fe—B-based rare earth magnet powder green compact layer by spin coating method or the like so as to form an R oxide particle slurry layer. The R oxide particle slurry layer is then coated with a slurry of glass powder or a mixed powder, consisting of glass powder as the main component with the addition of R oxide powder (hereinafter referred to as glass-based powder), by spin coating method or the like so as to form a glass-based powder slurry layer. Another R—Fe—B-based rare earth magnet green compact layer prepared by coating the glass-based powder slurry layer with the R oxide particle slurry is provided to face the R oxide particle slurry layer, thereby to make a stacked green compact. By hot pressing this stacked green compact, the rare earth magnet having high strength and high electrical resistance of the present invention shown in FIG. 1 is obtained.

The hot-pressed material thus obtained is constituted from the high strength and high electrical resistance composite layer 12 and the R—Fe—B-based rare earth magnet layer 11 stacked one on another as shown in FIG. 1. The high strength and high electrical resistance composite layer 12 has a structure such that the R oxide particle-based mixture layers 17 are stacked on both sides of the glass-based layer 16 in contact therewith, where the glass-based layer 16 is formed by softening and fusing the glass powder to form glass phase or causing the R oxide particles to disperse in the softened glass phase during the hot pressing process, and the R oxide particle-based mixture layer 17 is formed by causing the R-rich alloy phase, which contains 50 atomic % or more of R contained in the R—Fe—B-based rare earth magnet layer 11, to enter the grain boundary of the R oxide particles during the hot pressing process.

An example of manufacturing the rare earth magnet having high strength and high electrical resistance of the present invention shown in FIG. 2 is as follows.

An R—Fe—B-based rare earth magnet powder green compact layer is formed from an ordinary R—Fe—B-based rare earth magnet powder that has high magnetic anisotropy by a forming process in magnetic field. A sputtered layer of R oxide is formed on the surface of the R—Fe—B-based rare earth magnet powder green compact layer, and the sputtered layer of R oxide is coated with an R oxide particle slurry by spin coating method or the like, which is then dried so as to form an R oxide particle slurry layer. The R oxide particle slurry layer is then coated with a slurry of glass powder so as to form a glass powder slurry layer. Another R—Fe—B-based rare earth magnet powder green compact layer prepared by coating the glass-based powder slurry layer with the R oxide particle slurry layer is provided to face the R oxide particle slurry layer, thereby to make a stacked green compact. By hot pressing this stacked green compact, the rare earth magnet having high strength and high electrical resistance of the present invention shown in FIG. 2 is obtained.

The hot-pressed material thus obtained is constituted from the high strength and high electrical resistance composite layer 12 and the R—Fe—B-based rare earth magnet layer 11 stacked one on another, similarly to the rare earth magnet having high strength and high electrical resistance shown in FIG. 1. The high strength and high electrical resistance composite layer 12 has a structure such that the R oxide particle-based mixture layers 17 are stacked on both sides of the glass-based layer 16 in contact therewith, where the glass-based layer 16 is formed by softening and fusing the glass powder to form the glass phase or causing the R oxide particles to disperse in the softened glass phase during the hot pressing process, and the R oxide particle-based mixture layer 17 is formed by causing the R-rich alloy phase, which contains 50 atomic % or more of R contained in the R—Fe—B-based rare earth magnet layer 11, to enter the grain boundary of the R oxide particles during the hot pressing process.

An example of manufacturing the rare earth magnet having high strength and high electrical resistance of the present invention shown in FIG. 3 as follows.

An R—Fe—B-based rare earth magnet powder green compact layer is formed from an ordinary R—Fe—B-based rare earth magnet powder that has high magnetic anisotropy by a forming process in magnetic field. A sputtered layer of oxide of rare earth element is formed on the upper and lower surfaces or the upper surface of the R—Fe—B-based rare earth magnet powder green compact layer, so as to make at least two stacked bodies constituted from the R—Fe—B-based rare earth magnet powder green compact layer and the R oxide layer. These stacked bodies are placed one on another so as to provide the glass powder layer between the R oxide layers, thereby to form a stacked green compact constituted from the R—Fe—B-based rare earth magnet powder green compact layer, the R oxide layer, the glass powder layer, the R oxide layer, and the R—Fe—B-based rare earth magnet powder green compact layer in order. By hot pressing this stacked green compact, the rare earth magnet having high strength and high electrical resistance of the present invention shown in FIG. 3 is obtained.

The hot-pressed material thus obtained is constituted from the R—Fe—B-based rare earth magnet layers 31 and the high strength and high electrical resistance composite layer 32 that comprises the R oxide layers 33, 33 and the glass layer 34 stacked one on another, as shown in FIG. 3. The high strength and high electrical resistance composite layer 32 has the structure of interposing the glass layer 34 by the R oxide layers 33, 33. Since the high strength and high electrical resistance composite layer 32 has high strength and high electrical resistance, the rare earth magnet having high strength and high electrical resistance can be formed by providing the high strength and high electrical resistance composite layer 32 between the R—Fe—B-based rare earth magnet layers 31.

The glass layer of the high strength and high electrical resistance composite layer that constitutes the rare earth magnet having high strength and high electrical resistance may be any glass that is used in low temperature sintering of ceramics, such as $SiO_2$—$B_2O_3$—$Al_2O_3$-based glass, $SiO_2$—BaO—$Al_2O_3$-based glass, $SiO_2$—BaO—$B_2O_3$-based glass, $SiO_2$—BaO—$Li_2O_3$-based glass, $SiO_2$—$B_2O_3$—RrO-based glass (RrO represents an oxide of an alkaline earth metal), $SiO_2$—ZnO—RrO-based glass, $SiO_2$—MgO—$Al_2O_3$-based glass, $SiO_2$—$B_2O_3$—ZnO-based glass, $B_2O_3$—ZnO-based glass or $SiO_2$—$Al_2O_3$—RrO-based glass. In addition, glass having low softening point may also be used such as PbO—$B_2O_3$-based glass, $SiO_2$—$B_2O_3$—PbO-based glass, $Al_2O_3$—$B_2O_3$—PbO-based glass, Sn—$P_2O_5$-based glass, ZnO—$P_2O_5$-based glass, CuO—$P_2O_5$-based glass or $SiO_2$—$B_2O_3$—ZnO-based glass. It is preferable to use a glass that has softening point in a temperature range in which the hot pressing is carried out: from 500 to 900° C.

Another aspect of the present invention will be described.

Figure 4:
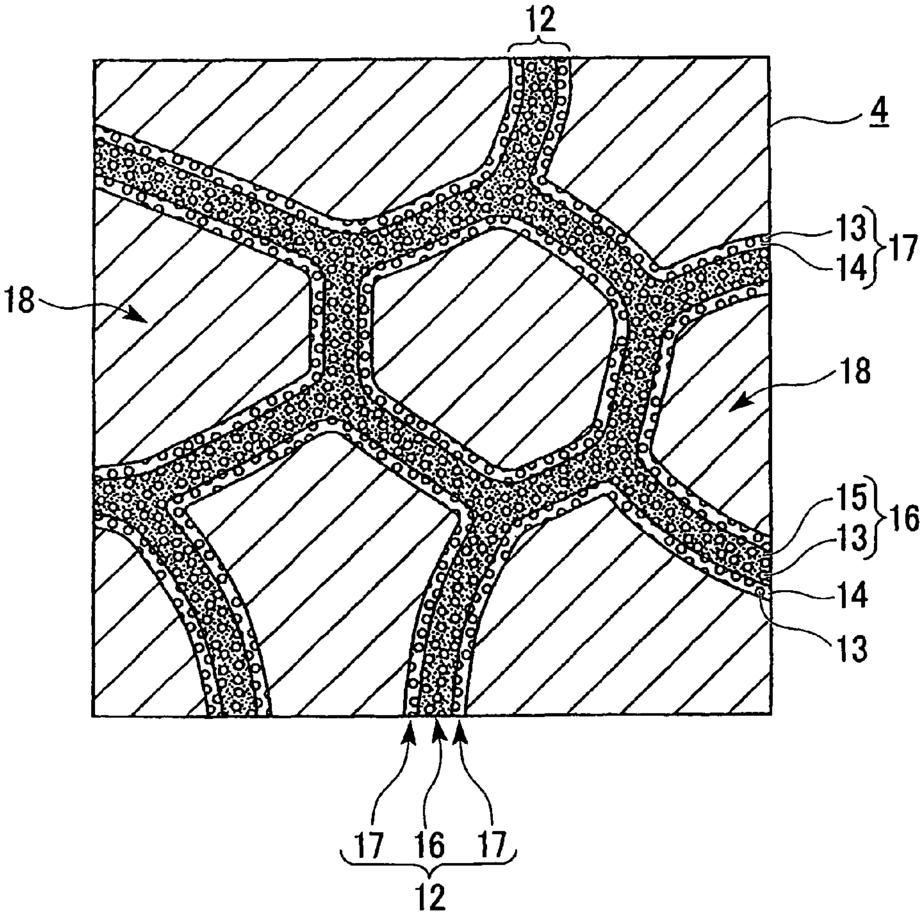
FIG. 4 is a schematic diagram showing the structure of a rare earth magnet of the present invention.

FIG. 4 is a schematic sectional view of the rare earth magnet having high strength and high electrical resistance described in (8). In FIG. 4, components other than R—Fe—B-based rare earth magnet particles 18 are the same as those of the rare earth magnet 1 shown in FIG. 1, and will be omitted in the description that follows.

The rare earth magnet 4 having high strength and high electrical resistance of the present invention shown in FIG. 4 has a structure such that the high strength and high electrical resistance composite layer 12 is provided in the grain boundaries between the R—Fe—B-based rare earth magnet particle 18 and the R—Fe—B-based rare earth magnet particle 18, so that the R—Fe—B-based rare earth magnet particles 18 are enclosed with the high strength and high electrical resistance composite layer 12. Thus high strength and high electrical resistance are achieved by the presence of the high strength and high electrical resistance composite layer 12 in the grain boundary between the R—Fe—B-based rare earth magnet particle 18 and the R—Fe—B-based rare earth magnet particle 18.

The glass-based layer 16 of the high strength and high electrical resistance composite layer 12 further improves the insulation property, and also makes the bonding with the R oxide particle-based mixture layer 17 stronger. In addition, the R oxide particle-based mixture layer 17 prevents the R—Fe—B-based rare earth magnet particles 18 and the glass-based layer 16 from reacting with each other, so that the magnetic property is prevented from decreasing and bonding strength is increased, thereby providing the rare earth magnet having high strength and high electrical resistance that is excellent also in magnetic property. Presence of the high strength and high electrical resistance composite layer 12 enables the rare earth magnet having high strength and high electrical resistance of the present invention to greatly improve the electrical resistance inside of the magnet so as to reduce the eddy current generated therein and thereby suppress the heat generation from the magnet significantly.

The high strength and high electrical resistance composite layer 12 may also include an R oxide layer formed on the surface of the R oxide particle-based mixture layer 17 opposite to the surface thereof that makes contact with the glass-based layer 16.

Figure 5:
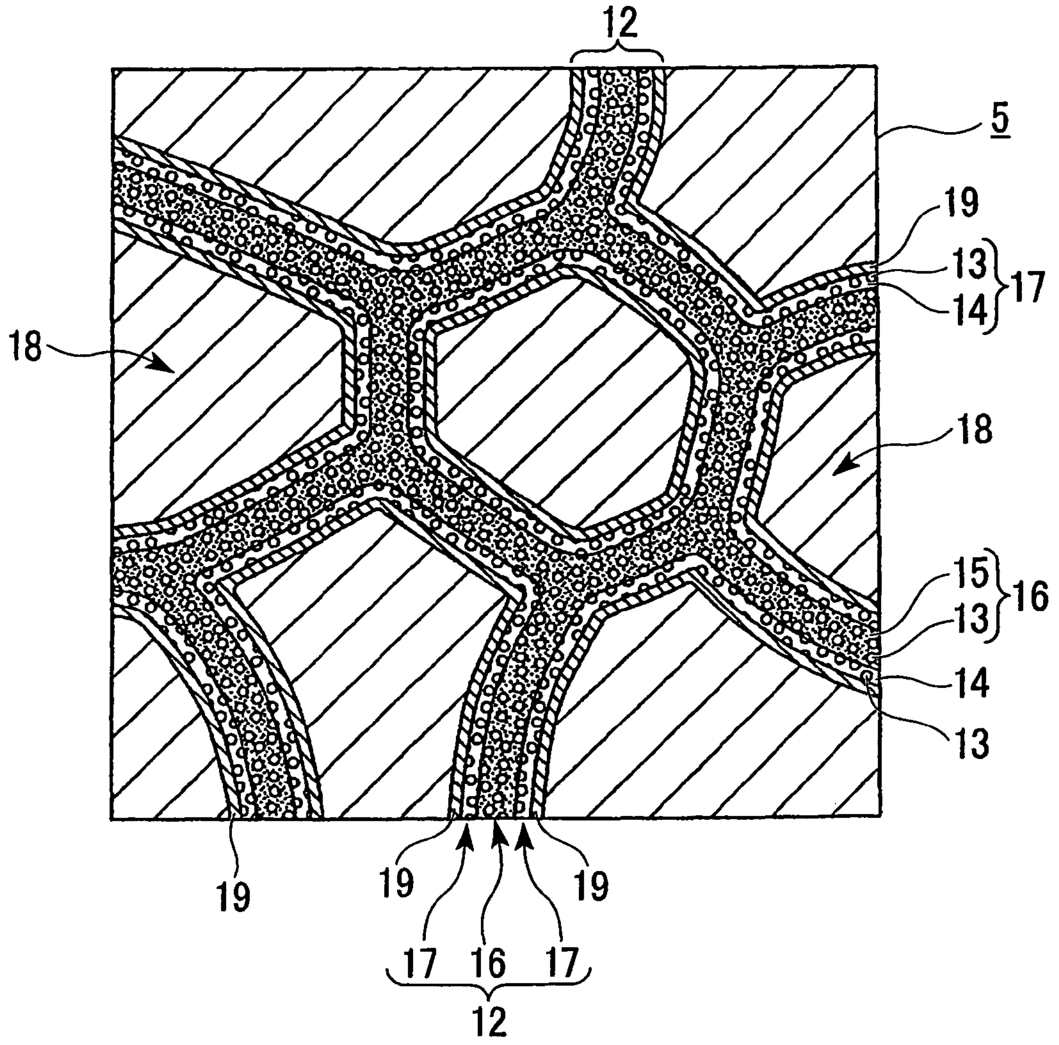
FIG. 5 is a schematic diagram showing the structure of a rare earth magnet of the present invention.

FIG. 5 is a schematic sectional view showing the rare earth magnet having high strength and high electrical resistance in the constitution that the rare earth magnet having high strength and high electrical resistance described in (8) has the R oxide layer, namely the rare earth magnet having high strength and high electrical resistance described in (9).

In FIG. 5, the constitution is the same as that of the rare earth magnet 4 shown in FIG. 4 except that the high strength and high electrical resistance composite layer 12 further contains an R oxide layer 19, and will be omitted in the description that follows.

The glass-based layer 16 and the R oxide layer 19 of the high strength and high electrical resistance composite layer 12 further improve the insulation property, and also make bonding with the R oxide particle-based mixture layer 17 stronger. In addition, the R oxide particle-based mixture layer 17 and the R oxide layer 19 prevent the R—Fe—B-based rare earth magnet particles 18 and the glass-based layer 16 from reacting with each other, so that the magnetic property is prevented from decreasing and bonding strength is increased. Presence of the high strength and high electrical resistance composite layer 12 increases the strength of the magnet as a whole and enables the magnet to endure severe vibration, greatly improve the electrical resistance inside of the magnet so as to reduce the eddy current generated therein and thereby suppress the heat generation from the magnet significantly, and make the rare earth magnet excellent also in the magnet property.

Figure 6:
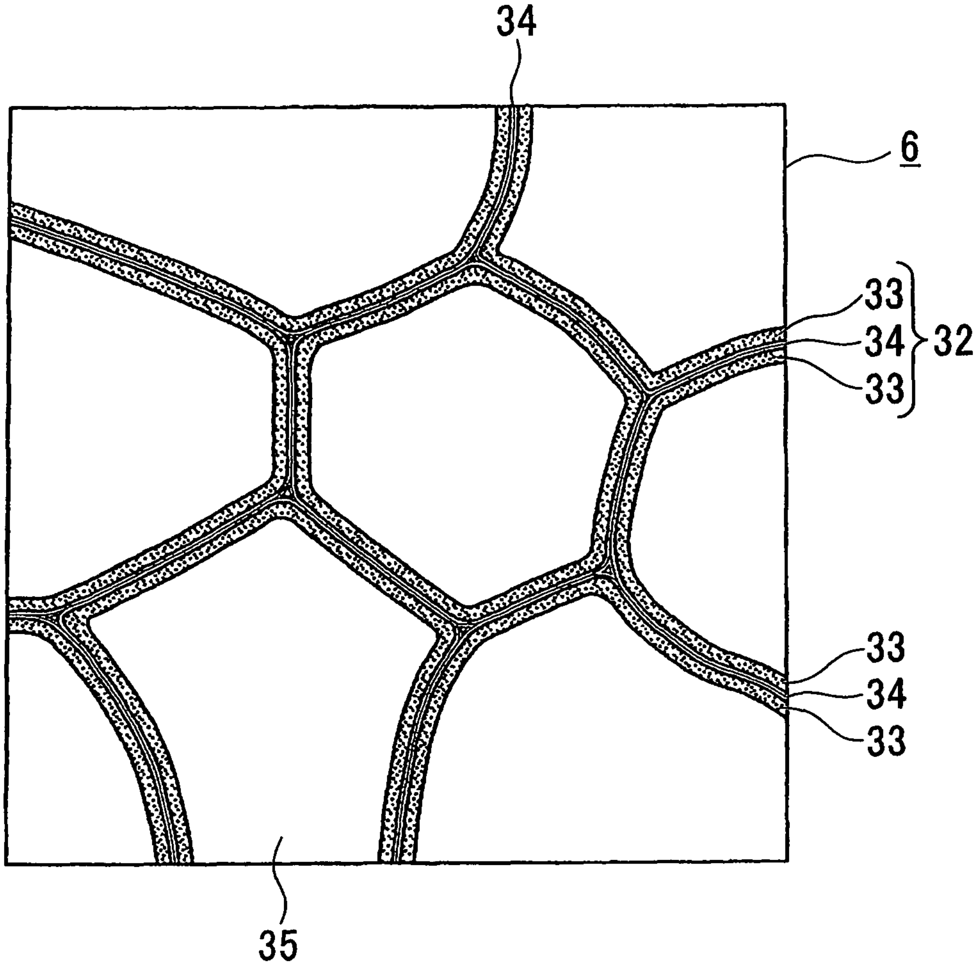
FIG. 6 is a schematic diagram showing the structure of a rare earth magnet of the present invention.

FIG. 6 is a schematic sectional view showing the rare earth magnet having high strength and high electrical resistance described in (21). In FIG. 6, the constitution is the same as that of the rare earth magnet 3 shown in FIG. 3 except that R—Fe—B-based rare earth magnet particles 35 are contained, and will be omitted in the description that follows.

The rare earth magnet having high strength and high electrical resistance of the present invention shown in FIG. 6 has a structure such as the high strength and high electrical resistance composite layer 32 constituted from the R oxide layers 33, 33 and the glass layer 34 in the grain boundary between the R—Fe—B-based rare earth magnet particles 35, and the R—Fe—B-based rare earth magnet particles 35 are enclosed with the high strength and high electrical resistance composite layer 32. Presence of the high strength and high electrical resistance composite layer 32 in the grain boundary between the R—Fe—B-based rare earth magnet particles 35 and the R—Fe—B-based rare earth magnet particles 35 results in stronger bonding between the R oxide layers 33 due to the glass layer 34 of the high strength and high electrical resistance composite layer 32, so that the mechanical strength of the rare earth magnet is greatly improved and insulation property is also improved, thus achieving high strength and high electrical resistance.

Presence of the high strength and high electrical resistance composite layer 32 enables the rare earth magnet having high strength and high electrical resistance of the present invention to greatly improve the electrical resistance inside of the magnet so as to reduce the eddy current generated therein and thereby suppress the heat generation from the magnet significantly.

The R—Fe—B-based rare earth magnet particles 18 and 35 may be a rare earth magnet powder of a composition such that 5 to 20% of R and 3 to 20% of B are contained with the balance consisting of Fe and inevitable impurities, or a rare earth magnet powder of a composition such that 5 to 20% of R, 3 to 20% of B, and 0.001 to 5% of M are contained with the balance consisting of Fe and inevitable impurities, or a rare earth magnet powder of a composition such that 5 to 20% of R, 0.1 to 50% of Co, and 3 to 20% of B are contained with the balance consisting of Fe and inevitable impurities, or a rare earth magnet powder of a composition such that 5 to 20% of R, 0.1 to 50% of Co, 3 to 20% of B, and 0.001 to 5% of M are contained with the balance consisting of Fe and inevitable impurities.

In the rare earth magnet having high strength and high electrical resistance represented by FIG. 4, the glass-based layer 16 is preferably formed by softening and fusing the glass powder to form a glass phase or causing the R oxide particles to disperse in the softened glass phase during the hot pressing process, and the R oxide particle-based mixture layer 17 is preferably formed by causing the R-rich alloy phase which contains 50 atomic % or more of R contained in the R—Fe—B-based rare earth magnet particles 18 to enter the grain boundary of the R oxide particles during the hot pressing process.

R of the R oxide particles 13 that constitute the high strength and high electrical resistance composite layer 12 may or may not be the same as the R contained in the R—Fe—B-based rare earth magnet particles 18, it is preferably one or more selected from the group consisting of Y, Gd, Tb, Dy, Ho, Er, Tm, Yb, and Lu, and is more preferably Tb and/or Dy.

R of the R-rich alloy layer 14 is preferably the same as the R of the R—Fe—B-based rare earth magnet particles 18, but may also be different from the R of the R—Fe—B-based rare earth magnet particles 18.

In the rare earth magnet having high strength and high electrical resistance represented by FIG. 5, the high strength and high electrical resistance composite layer 12 is formed in a structure such that the R oxide particle-based mixture layers 17 are formed on both sides of the glass-based layer 16 in contact therewith and has the R oxide layer 19 formed on the surface of the R oxide particle-based mixture layer 17 opposite to the surface thereof that makes contact with the glass-based layer 16. The high strength and high electrical resistance composite layer 12 encloses the R—Fe—B-based rare earth magnet particles 18.

It is preferable that the glass-based layer 16 is formed by softening and fusing the glass powder to form the glass phase or causing the R oxide particles to disperse in the softened glass phase during formation by hot pressing, and the R oxide particle-based mixture layer 17 is formed by causing the R-rich alloy phase which contains 50 atomic % or more of R contained in the R—Fe—B-based rare earth magnet particles 18 to enter the grain boundary of the R oxide particles during formation by hot pressing.

Thus, the R oxide particle-based mixture layer 7 is formed as the R-rich alloy phase which contains 50 atomic % or more of R contained in the R—Fe—B-based rare earth magnet particles 18 enters through a portion of the R oxide layer 19 where it is cracked or peeled off into the grain boundary of the R oxide particles during formation by hot pressing.

While R of the R oxide layer 13 and R of the R oxide layer 19 that constitute the high strength and high electrical resistance composite layer 12 may or may not be the same as the R contained in the R—Fe—B-based rare earth magnet particles 18, it is preferably one or more selected from the group consisting of Y, Gd, Tb, Dy, Ho, Er, Tm, Yb, and Lu, and is more preferably Tb and/or Dy. Also R of the R-rich alloy layer 14 is preferably the same as the R of the R—Fe—B-based rare earth magnet particles 18, but may also be different from the R of the R—Fe—B-based rare earth magnet particles 18.

In the rare earth magnet having high strength and high electrical resistance represented by FIG. 6, while R of the R oxide layer 33 that constitutes the high strength and high electrical resistance composite layer 32 may or may not be the same as the R contained in the R—Fe—B-based rare earth magnet layer 31, it is preferably one or more kinds from the group consisting of Y, Gd, Tb, Dy, Ho, Er, Tm, Yb, and Lu, and is more preferably Tb and/or Dy.

The R—Fe—B-based rare earth magnet particles 18 and 35 are preferably magnetically anisotropic HDDR magnetic particles having a fundamental structure shaving a recrystallization texture consisting of adjoining recrystallized grains that are constituted from an $R_2Fe_{14}B$ type intermetallic compound phase of substantially tetragonal structure as the main phase, while the recrystallization texture has a constitution such that 50% by volume or more of the recrystallized grains are those which have such a shape as the ratio b/a of the least grain size a and the largest grain size b of the recrystallized grain is less than 2, and average size of the recrystallized grains is in a range from 0.05 to 5 μm.

An example of manufacturing the R—Fe—B-based rare earth magnet particles of the rare earth magnet having high strength and high electrical resistance of the present invention is as follows.

An alloy material, that has a composition such that 5 to 20% of R and 3 to 20% of B are contained, or 0.1 to 50% of Co is also additionally contained as required, or 0.001 to 5% of M is further additionally contained as required, with the balance consisting of Fe and inevitable impurities, is crushed so as to achieve the average particle size in a range from 10 to 1000 μm by hydrogen absorption decay crushing or by the common crushing process in an inert gas atmosphere, so as to prepare the R—Fe—B-based rare earth magnet alloy material powder. The R—Fe—B-based rare earth magnet alloy material powder, with hydrogenated rare earth element powder mixed therein as required, is heated to a temperature below 500° C. in hydrogen gas atmosphere of pressure in a range from 10 to 1000 kPa, or heated and kept at this temperature, thereby to apply hydrogen absorption treatment. Then, the R—Fe—B-based rare earth magnet alloy material is heated to a temperature in a range from 500 to 1000° C. in hydrogen gas atmosphere of pressure in a range from 10 to 1000 kPa, and kept at this temperature, thereby to apply hydrogen absorption and decomposition treatment to the mixed powder. Then, as required, the mixed powder that has been subjected to the hydrogen absorption and decomposition treatment is subjected to intermediate heat treatment by keeping it at a temperature in a range from 500 to 1000° C. in an inert gas atmosphere of pressure in a range from 10 to 1000 kPa. Then, as required, the mixed powder that has been subjected to the intermediate heat treatment is subjected to heat treatment in reduced pressure hydrogen while letting a part of hydrogen remain in the mixed powder at a temperature in a range from 500 to 1000° C. in hydrogen atmosphere of pressure in a range from 0.65 to 10 kPa, or in a mixed gas atmosphere of hydrogen with partial pressure of 0.65 to 10 kPa and an inert gas. This is followed by dehydrogenation treatment in which the powder is kept in vacuum of 0.13 kPa or lower pressure at a temperature in a range from 500 to 1000° C. so as to force the powder to release hydrogen. The material is then cooled and crushed so as to make R—Fe—B-based HDDR rare earth magnet alloy powder. It is preferable that the R—Fe—B-based rare earth magnet particles are made by using the R—Fe—B-based HDDR rare earth magnet alloy powder.

An example of manufacturing the rare earth magnet having high strength and high electrical resistance of the present invention is as follows.

The R oxide particles are adhered by using PVA (polyvinyl alcohol) onto the surface of the ordinary HDDR rare earth magnet powder of high magnetic anisotropy, and glass powder is further adhered thereon with PVA, thereby to prepare a coated rare earth magnet powder. The coated rare earth magnet powder is subjected to heat treatment at a temperature in a range from 400 to 500° C. in vacuum so as to remove the PVA, followed by forming in a magnetic field and hot pressing, thereby making the rare earth magnet.

The hot-pressed material thus obtained has a structure such that the particles of the rare earth element powder 18 are enclosed with the high strength and high electrical resistance composite layer 12 as shown in FIG. 4 and FIG. 5, so that the rare earth magnet having high strength and high electrical resistance is formed due to high strength and high electrical resistance of the high strength and high electrical resistance composite layer 12.

When manufacturing the rare earth magnet having high strength and high electrical resistance represented by FIG. 5, instead of the process of adhering the R oxide particles on the surface of the HDDR rare earth element powder by means of PVA, oxide of R is formed on the surface of the R—Fe—B-based rare earth magnet powder so as to make oxide-coated R—Fe—B-based rare earth magnet powder by means of a sputtering apparatus that employs a rotary barrel, for example, and R oxide particles are adhered onto the surface of the oxide-coated R—Fe—B-based rare earth magnet powder by means of PVA.

An example of manufacturing the rare earth magnet having high strength and high electrical resistance represented by FIG. 6 is as follows.

The R oxide layer is adhered by means of a sputtering apparatus that employs a rotary barrel, for example, onto the surface of the ordinary R—Fe—B-based rare earth magnet powder of high magnetic anisotropy, thereby to prepare oxide-coated R—Fe—B-based rare earth magnet powder. A mixture of the oxide-coated R—Fe—B-based rare earth magnet powder and glass powder is formed in a magnetic field and hot pressing process is carried out, thereby making the rare earth magnet.

As shown in FIG. 6, the hot-pressed material thus obtained has a structure such that the particles of the R—Fe—B-based rare earth element powder 35 are enclosed with the high strength and high electrical resistance composite layer 32, so that the rare earth magnet having high strength and high electrical resistance is formed due to high strength and high electrical resistance of the high strength and high electrical resistance composite layer 32.

The glass layer of the high strength and high electrical resistance composite layer that constitutes the rare earth magnet having high strength and high electrical resistance may be any glass that is used in low temperature sintering of ceramics, such as $SiO_2$—$B_2O_3$—$Al_2O_3$-based glass, $SiO_2$—BaO—$Al_2O_3$-based glass, $SiO_2$—BaO—$B_2O_3$-based glass, $SiO_2$—BaO—$Li_2O_3$-based glass, $SiO_2$—$B_2O_3$—RrO-based glass (RrO represents an oxide of an alkaline earth metal), $SiO_2$—ZnO—RrO-based glass, $SiO_2$—MgO—$Al_2O_3$-based glass, $SiO_2$—$B_2O_3$—ZnO-based glass, $B_2O_3$—ZnO-based glass, or $SiO_2$—$Al_2O_3$—RrO-based glass. In addition, glass having low softening point may also be used such as PbO—$B_2O_3$-based glass, $SiO_2$—$B_2O_3$—PbO-based glass, $Al_2O_3$—$B_2O_3$—PbO-based glass, SnO—$P_2O_5$-based glass, ZnO—$P_2O_5$-based glass, CuO—$P_2O_5$-based glass, or $SiO_2$—$B_2O_3$—ZnO-based glass. It is preferable to use a glass that has softening point in a temperature range in which the hot pressing is carried out: from 500 to 900° C.

EXAMPLES

R—Fe—B-based rare earth magnet powders A through T, that had been subjected to HDDR treatment and had the compositions shown in Table 1, all having the average particle size of 300 μm were prepared.

TABLE 1

| Types | | Composition (atomic %) (with the balance consisting of Fe) |
|---|---|---|
| R—Fe—B—based rare earth magnet powders | A | Nd: 13%, Dy: 1.5%, Co: 5.8%, B: 6.2%, Zr: 0.1%, Ga: 0.4% |
| | B | Nd: 12.4%, Dy: 0.6%, Co: 20%, B: 6.2%, Zr: 0.1%, Ga: 0.4%, Al: 1.5% |
| | C | Nd: 13.5%, Co: 17.0%, B: 6.5%, Zr: 0.1%, Ga: 0.3% |
| | D | Nd: 11.6%, Dy: 1.8%, Pr: 0.2%, B: 6.1% |
| | E | Nd: 12.5%, Dy: 0.8%, Pr: 0.2%, Co: 7.0%, B: 6.5%, Zr: 0.1%, Ti: 0.3% |
| | F | Nd: 12.5%, Pr: 0.5%, Co: 18.0%, B: 6.5%, Zr: 0.1%, Ga: 0.3% |
| | G | Nd: 12.9%, Ho: 0.4%, Co: 14.7%, B: 6.8%, Hf: 0.1%, Si: 0.1%, W: 0.5% |
| | H | Nd: 12.0%, Dy: 1.8%, B: 6.5%, Hf: 0.1% |
| | I | Nd: 12.3%, Dy: 1.8%, Co: 16.9%, B: 6.6%, Zr: 0.2%, Ga: 0.3%, Al: 0.5% |
| | J | Nd: 11.0%, Pr: 3.0%, Co: 20.0%, B: 6.5%, Ga: 0.3%, Si: 0.1% |
| | K | Nd: 9.0%, Lu: 4.0%, Co: 10.0%, B: 6.5%, Nb: 0.4% |
| | L | Nd: 8.0%, Dy: 5.0%, Co: 5.0%, B: 6.5%, Zr: 0.1%, Ta: 0.4% |
| | M | Nd: 11.4%, Dy: 2.1%, Co: 15.0%, B: 7.0% |
| | N | Nd: 12.2%, Tb: 1.2%, Co: 12.0%, B: 7.5%, Ge: 0.3%, Cr: 0.1% |
| | O | Nd: 11.3%, Pr: 2.0%, Gd: 0.1%, B: 6.8%, V: 0.1%, Cu: 0.1% |
| | P | Nd: 12.4%, Dy: 1.0%, Co: 8.0%, B: 6.5%, Ni: 0.1%, Mo: 0.3% |
| | Q | Nd: 11.2%, Pr: 1.6%, Co: 11.2%, B: 6.5%, Zr: 0.1%, Ga: 0.3%, C: 0.2% |
| | R | Nd: 13.0%, Dy: 1.0%, Y: 0.5%, Co: 2.5%, B: 6.0%, Zr: 0.1%, Ga: 0.4% |
| | S | Nd: 12.5%, Er: 1.0%, Co: 12.0%, B: 7.5%, Zr: 0.05%, Ga: 0.3% |
| | T | Nd: 12.5%, Ho: 1.0%, B: 6.8%, Zr: 0.2%, Ga: 0.2%, Al: 1.5% |

Example 1

Rare Earth Magnet Having High Strength and High Electrical Resistance Represented by FIG. 1

R—Fe—B-based rare earth magnet green compact layers having thickness of 3 mm were formed in a magnetic field from the R—Fe—B-based rare earth magnet powders A through T shown in Table 1.

R oxide powder slurries were formed from $Dy_2O_3$, $Pr_2O_3$, $La_2O_3$, $Nd_2O_3$, $CeO_2$, $Tb_2O_3$, $Gd_2O_3$, $Pr_2O_3$, $Y_2O_3$, $Er_2O_3$, and $Sm_2O_3$, and glass powders having compositions shown in Tables 2 through 5 with the average particle size of 2 μm were prepared. Top surface of the R—Fe—B-based rare earth magnet green compact layer is coated with the R oxide powder slurry so as to form R oxide powder slurry layer, which was further coated with a glass powder slurry so as to form a glass powder slurry layer, thereby making one of the stacked bodies. Furthermore, the R oxide powder slurry was applied to the top surface of another R—Fe—B-based rare earth magnet green compact layer so as to form an R oxide powder slurry layer, thereby making the other stacked body.

The stacked bodies were put together so as to provide the glass powder slurry layer, thereby making the stacked green compact. The stacked green compact was hot-pressed at a temperature of 750° C. under a pressure of 147 MPa, thereby making the rare earth magnets 1 through 20 of the present invention in the form of bulk measuring 10 mm in length, 10 mm in width and 6.5 mm in height. The rare earth magnets 1 through 20 of the present invention made in this way all showed the constitution shown in FIG. 1 in which the high strength and high electrical resistance composite layer 12 has a structure consisting of the glass-based layer 16 of the structure consisting of a glass phase or the R oxide particles dispersed in the glass phase, and the R oxide particle-based mixture layers 17 that have a mixed structure containing an R-rich alloy phase which contains 50 atomic % or more of R and the R oxide particles are formed on both sides of the glass-based layer 16, while the high strength and high electrical resistance composite layer 12 is provided between the R—Fe—B-based rare earth magnet layers 11, 11.

The rare earth magnets 1 through 20 of the present invention made as described above were polished on the top and bottom surfaces and four side faces thereof. A pair of voltage terminals were applied with a space of 4 mm from each other to the rare earth magnets 1 through 20 of the present invention that were polished, across one R—Fe—B-based rare earth magnet layer to the other R—Fe—B-based rare earth magnet layer of the side face including the high strength and high electrical resistance composite layer straddling the high strength and high electrical resistance composite layer. A pair of current terminals were applied with a space of 6 mm from each other so as to cross over the pair of voltage terminals. Resistance R=E/I (Ω) was calculated from the voltage drop E (V) across the voltage terminals when a predetermined current I (A) was flown between the current terminals, and resistance was calculated from cross sectional area A (approximately 100 mm$^2$) and the distance d between the terminals (=4 mm) by formula R×A/d, with the results shown in Tables 2 through 5.

Remanence (Br (T)), coercivity (iHc (MA/m)), and maximum energy product (MHmax (kJ/m$^3$)) of the rare earth magnets 1 through 20 of the present invention were measured, with the results shown in Tables 2 through 5, and then, transverse rupture strength of the rare earth magnets 1 through 20 of the present invention were measured, with the results shown in Tables 2 through 5.

Comparative Example 1

Two of the other stacked bodies having the R oxide powder slurry layer formed thereon by applying the R oxide powder slurry on the top surface of the R—Fe—B-based rare earth magnet green compact layer made in Example 1 were prepared. The stacked bodies were put together with the R oxide particle slurry layers facing each other so as to form the stacked green compact constituted from the R—Fe—B-based rare earth magnet green compact layer, the R oxide powder slurry layer, the R oxide powder slurry layer and the R—Fe—B-based rare earth magnet green compact layer. The stacked green compact was hot-pressed at a temperature of 750° C. under a pressure of 147 MPa, thereby making the rare earth magnets 1 through 20 of the prior art in the form of bulk constituted from the R—Fe—B-based rare earth magnet layer and the R oxide layer measuring 10 mm in length, 10 mm in width and 6.5 mm in thickness.

The rare earth magnets 1 through 20 of the present invention made as described above were polished on the top and bottom surfaces and four side faces thereof. A pair of voltage terminals were applied with a space of 4 mm from each other to the rare earth magnets 1 through 20 of the present invention that were polished, across one R—Fe—B-based rare earth magnet layer to the other R—Fe—B-based rare earth magnet layer of the side face including the oxide layer while straddling the R oxide layer. A pair of current terminals were applied with a space of 6 mm from each other so as to cross over the pair of voltage terminals. Resistance R=E/I (Ω) was calculated from the voltage drop E (V) across the voltage terminals when a predetermined current I (A) was flown between the current terminals, and resistance was calculated from cross sectional area A (approximately 100 mm$^2$) and the distance d between the terminals (=4 mm) by formula R×A/d, with the results shown in Tables 2 through 5.

Remanence, coercivity and maximum energy product of the rare earth magnets 1 through 20 of the prior art were measured, with the results shown in Tables 2 through 5, then transverse rupture strength of the rare earth magnets 1 through 20 of the prior art were measured, with the results shown in Tables 2 through 5.

TABLE 2

| Rare earth magnet | | Composition of R—Fe—B-based rare earth magnet layer | High strength and high electrical resistance composite layer: R oxide particle-based mixture layer: R oxide particles | Alloy phase | Glass-based layer: R oxide particles | Content of glass layer | Properties: Br (T) | iHc (MA/m$^3$) | BHmax (kJ/m$^3$) | Resistivity (μΩm) | Transverse rupture strength (MPa) |
|---|---|---|---|---|---|---|---|---|---|---|---|
| Present invention | 1 | R—Fe—B-based rare earth magnet powder A | $Dy_2O_3$ | R-rich phase | $Dy_2O_3$ | $SiO_2$—$B_2O_3$-RrO | 1.19 | 1.81 | 251 | 480 | 119 |
| Prior art | | | | | $Dy_2O_3$ | | 1.19 | 1.79 | 251 | 21 | 23 |

TABLE 2-continued

| | | | High strength and high electrical resistance composite layer | | | | Properties | | | | |
|---|---|---|---|---|---|---|---|---|---|---|---|
| | | Composition of R—Fe—B-based | R oxide particle-based mixture layer | | Glass-based layer | | | | | | Transverse rupture |
| Rare earth magnet | | rare earth magnet layer | R oxide particles | Alloy phase | R oxide particles | Content of glass layer | Br (T) | iHc (MA/m³) | BHmax (kJ/m³) | Resistivity (μΩm) | strength (MPa) |
| Present invention | 2 | R—Fe—B-based rare earth magnet | $Dy_2O_3$ | R-rich phase | $Dy_2O_3$ | $SiO_2$—$B_2O_3$—ZnO | 1.23 | 1.50 | 267 | 620 | 129 |
| Prior art | | powder B | | | $Dy_2O_3$ | | 1.23 | 1.49 | 268 | 24 | 24 |
| Present invention | 3 | R—Fe—B-based rare earth magnet | $Dy_2O_3$ | R-rich phase | $Dy_2O_3$ | $SiO_2$—$B_2O_3$-RrO | 1.24 | 1.02 | 273 | 1190 | 163 |
| Prior art | | powder C | | | $Dy_2O_3$ | | 1.24 | 1.01 | 273 | 28 | 25 |
| Present invention | 4 | R—Fe—B-based rare earth magnet | $Dy_2O_3$ | R-rich phase | $Dy_2O_3$ | $SiO_2$—$B_2O_3$—$Al_2O_3$ | 1.16 | 1.50 | 239 | 3430 | 230 |
| Prior art | | powder D | | | $Dy_2O_3$ | | 1.16 | 1.48 | 241 | 45 | 26 |
| Present invention | 5 | R—Fe—B-based rare earth magnet | $Dy_2O_3$ | R-rich phase | $Dy_2O_3$ | SiO2—BaO—$Al_2O_3$ | 1.19 | 1.54 | 251 | 1610 | 117 |
| Prior art | | powder E | | | $Dy_2O_3$ | | 1.19 | 1.52 | 251 | 38 | 24 |

TABLE 3

| | | | High strength and high electrical resistance composite layer | | | | Properties | | | | |
|---|---|---|---|---|---|---|---|---|---|---|---|
| | | Composition of R—Fe—B-based | R oxide particle-based mixture layer | | Glass-based layer | | | | | | Transverse rupture |
| Rare earth magnet | | rare earth magnet layer | R oxide particles | Alloy phase | R oxide particles | Content of glass layer | Br (T) | iHc (MA/m³) | BHmax (kJ/m³) | Resistivity (μΩm) | strength (MPa) |
| Present invention | 6 | R—Fe—B-based rare earth magnet | $Pr_2O_3$ | R-rich phase | $Pr_2O_3$ | SiO2—BaO—$B_2O_3$ | 1.21 | 1.17 | 262 | 2290 | 200 |
| Prior art | | powder F | | | $Pr_2O_3$ | | 1.21 | 1.15 | 262 | 33 | 27 |
| Present invention | 7 | R—Fe—B-based rare earth magnet | $Ho_2O_3$ | R-rich phase | $Ho_2O_3$ | SiO2—BaO—$Li_2O_3$ | 1.18 | 1.13 | 246 | 460 | 119 |
| Prior art | | powder G | | | $Ho_2O_3$ | | 1.18 | 1.12 | 246 | 23 | 23 |
| Present invention | 8 | R—Fe—B-based rare earth magnet | $Dy_2O_3$ | R-rich phase | $Dy_2O_3$ | $SiO_2$—MgO—$Al_2O_3$ | 1.15 | 1.71 | 234 | 3500 | 231 |
| Prior art | | powder H | | | $Dy_2O_3$ | | 1.15 | 1.69 | 236 | 35 | 28 |
| Present invention | 9 | R—Fe—B-based rare earth magnet | $Nd_2O_3$ | R-rich phase | $Nd_2O_3$ | $SiO_2$—ZnO—BrO | 1.17 | 1.63 | 245 | 2800 | 215 |
| Prior art | | powder I | | | $Nd_2O_3$ | | 1.17 | 1.61 | 245 | 50 | 24 |
| Present invention | 10 | R—Fe—B-based rare earth magnet | $Nd_2O_3$ | R-rich phase | $Nd_2O_3$ | SiO2—$B_2O_3$—ZnO | 1.19 | 1.16 | 251 | 1870 | 180 |
| Prior art | | powder J | | | $Nd_2O_3$ | | 1.19 | 1.15 | 251 | 40 | 24 |

TABLE 4

| | | | High strength and high electrical resistance composite layer | | | | Properties | | | | |
|---|---|---|---|---|---|---|---|---|---|---|---|
| | | Composition of R—Fe—B-based | R oxide particle-based mixture layer | | Glass-based layer | | | | | | Transverse rupture |
| Rare earth magnet | | rare earth magnet layer | R oxide particles | Alloy phase | R oxide particles | Content of glass layer | Br (T) | iHc (MA/m³) | BHmax (kJ/m³) | Resistivity (μΩm) | strength (MPa) |
| Present invention | 11 | R—Fe—B-based rare earth magnet | $Lu_2O_3$ | R-rich phase | $Lu_2O_3$ | SiO2—$Al_2O_3$-RrO | 1.18 | 0.98 | 246 | 1310 | 166 |
| Prior art | | powder K | | | $Lu_2O_3$ | | 1.18 | 0.97 | 246 | 25 | 26 |
| Present invention | 12 | R—Fe—B-based rare earth magnet | $Dy_2O_3$ | R-rich phase | $Dy_2O_3$ | $B_2O_3$—ZnO | 1.21 | 1.84 | 262 | 1940 | 190 |
| Prior art | | powder L | | | $Dy_2O_3$ | | 1.21 | 1.83 | 262 | 43 | 24 |
| Present invention | 13 | R—Fe—B-based rare earth magnet | $Dy_2O_3$ | R-rich phase | $Dy_2O_3$ | PbO—$B_2O_3$ | 1.17 | 1.59 | 245 | 3240 | 224 |
| Prior art | | powder M | | | $Dy_2O_3$ | | 1.17 | 1.58 | 245 | 58 | 23 |
| Present invention | 14 | R—Fe—B-based rare earth magnet | $Tb_2O_3$ | R-rich phase | $Tb_2O_3$ | $SiO_2$—$B_2O_3$—PbO | 1.16 | 1.48 | 239 | 2480 | 207 |
| Prior art | | powder N | | | $Tb_2O_3$ | | 1.16 | 1.47 | 241 | 48 | 24 |
| Present invention | 15 | R—Fe—B-based rare earth magnet | $Gd_2O_3$ | R-rich phase | $Gd_2O_3$ | $Al_2O_3$—$B_2O_3$—PbO | 1.20 | 1.14 | 256 | 1260 | 161 |
| Prior art | | powder O | | | $Gd_2O_3$ | | 1.20 | 1.13 | 257 | 35 | 24 |

TABLE 5

| Rare earth magnet | | Composition of R—Fe—B-based rare earth magnet layer | High strength and high electrical resistance composite layer: R oxide particle-based mixture layer: R oxide particles | Alloy phase | Glass-based layer: R oxide particles | Content of glass layer | Properties: Br (T) | iHc (MA/m$^3$) | BHmax (kJ/m$^3$) | Resistivity (μΩm) | Transverse rupture strength (MPa) |
|---|---|---|---|---|---|---|---|---|---|---|---|
| Present invention | 16 | R—Fe—B-based rare earth magnet | $Dy_2O_3$ | R-rich phase | — | $SnO—P_2O_5$ | 1.19 | 1.54 | 251 | 1010 | 154 |
| Prior art | | powder P | | | $Dy_2O_3$ | | 1.19 | 1.52 | 252 | 25 | 23 |
| Present invention | 17 | R—Fe—B-based rare earth magnet | $Pr_2O_3$ | R-rich phase | — | $ZnO—P_2O_5$ | 1.21 | 1.06 | 261 | 1820 | 181 |
| Prior art | | powder Q | | | $Pr_2O_3$ | | 1.21 | 1.05 | 262 | 38 | 25 |
| Present invention | 18 | R—Fe—B-based rare earth magnet | $Y_2O_3$ | R-rich phase | — | $ZnO—P_2O_5$ | 1.13 | 1.66 | 229 | 1950 | 188 |
| Prior art | | powder R | | | $Y_2O_3$ | | 1.14 | 1.65 | 231 | 35 | 26 |
| Present invention | 19 | R—Fe—B-based rare earth magnet | $Er_2O_3$ | R-rich phase | — | $CuO—P_2O_5$ | 1.16 | 1.51 | 240 | 1520 | 176 |
| Prior art | | powder S | | | $Er_2O_3$ | | 1.16 | 1.50 | 241 | 30 | 26 |
| Present invention | 20 | R—Fe—B-based rare earth magnet | $Ho_2O_3$ | R-rich phase | — | $SiO_2—B_2O_3—ZnO$ | 1.19 | 1.40 | 250 | 1870 | 182 |
| Prior art | | powder T | | | $Ho_2O_3$ | | 1.19 | 1.39 | 251 | 38 | 25 |

From the results shown in Tables 2 through 5, it can be seen that the rare earth magnets 1 through 20 of the present invention have particularly higher strength and higher electrical resistance than the rare earth magnets 1 through 20 of the prior art.

Example 2

R oxide powders made of $Dy_2O_3$, $Pr_2O_3$, $La_2O_3$, $Nd_2O_3$, $CeO_2$, $Tb_2O_3$, $Gd_2O_3$, $Pr_2O_3$, $Y_2O_3$, $Er_2O_3$, and $Sm_2O_3$ were adhered using 0.1% by weight of PVA to the surface of the R—Fe—B-based rare earth magnet powders A through T previously prepared by HDDR treatment shown in Table 1, to a thickness of 2 μm, and glass powders shown in Tables 6 through 9 were further adhered thereon with 0.1% by weight of PVA (polyvinyl alcohol), thereby to prepare the oxide-coated R—Fe—B-based rare earth magnet powder. The oxide-coated R—Fe—B-based rare earth magnet powder was subjected to heat treatment at a temperature of 450° C. in vacuum so as to remove the PVA, followed by preliminary forming in a magnetic field under a pressure of 49 MPa and hot pressing at a temperature of 730° C. under a pressure of 294 MPa, thereby making the rare earth magnets 21 through 40 of the present invention in the form of bulk measuring 10 mm in length, 10 mm in width, and 7 mm in height. The rare earth magnets 21 through 40 of the present invention showed the constitution shown in FIG. 4 in which the high strength and high electrical resistance composite layer 12 comprising the glass-based layer 16, which had the structure consisting of a glass phase or R oxide particles dispersed in glass phase, and the R oxide particle-based mixture layers 17, that had mixed structure of the R-rich alloy phase which contained 50 atomic % or more of R and the R oxide particles, and were formed on both sides of the glass-based layer 16, enclosed the R—Fe—B-based rare earth magnet particles 18.

The rare earth magnets 21 through 40 of the present invention in the form of bulk made as described above were polished on the surfaces thereof, and resistivity was measured with the results shown in Tables 6 through 9.

Remanence, coercivity and maximum energy product of the rare earth magnets 21 through 40 of the present invention were measured by the ordinary methods, with the results shown in Tables 6 through 9, then transverse rupture strength of the rare earth magnets 21 through 40 of the present invention were measured, with the results shown in Tables 6 through 9.

Comparative Example 2

The oxide-coated R—Fe—B-based rare earth magnet powder made in Example 2 was subjected to preliminary forming in a magnetic field under a pressure of 49 MPa and then subjected to hot pressing at a temperature of 730° C. under a pressure of 294 MPa, thereby making the rare earth magnets 21 through 40 of the prior art in the form of bulk measuring 10 mm in length, 10 mm in width, and 7 mm in height having a structure such that the R—Fe—B-based rare earth magnet particles were enclosed with the R oxide layers.

The rare earth magnets 21 through 40 of the prior art in the form of bulk made as described above were polished on the surface, and resistivity was measured on each one with the results shown in Tables 6 through 9.

Remanence, coercivity and maximum energy product of the rare earth magnets 21 through 40 of the prior art were measured by the ordinary methods, with the results shown in Tables 6 through 9, then transverse rupture strength of the rare earth magnets 21 through 40 of the prior art were measured, with the results shown in Tables 6 through 9.

TABLE 6

| Rare earth magnet | | Composition of R—Fe—B-based rare earth magnet layer | High strength and high electrical resistance composite layer: R oxide particle-based mixture layer: R oxide particles | Alloy phase | Glass-based layer: R oxide particles | Content of glass layer | Properties: Br (T) | iHc (MA/m$^3$) | BHmax (kJ/m$^3$) | Resistivity (μΩm) | Transverse rupture strength (MPa) |
|---|---|---|---|---|---|---|---|---|---|---|---|
| Present invention | 21 | R—Fe—B-based rare earth magnet | $Dy_2O_3$ | R-rich phase | $Dy_2O_3$ | $SiO_2—B_2O_3$-RrO | 1.16 | 1.81 | 238 | 2180 | 193 |
| Prior art | | powder A | | | $Dy_2O_3$ | | 1.18 | 1.79 | 246 | 47 | 38 |

TABLE 6-continued

| Rare earth magnet | | Composition of R—Fe—B-based rare earth magnet layer | High strength and high electrical resistance composite layer: R oxide particle-based mixture layer: R oxide particles | Alloy phase | Glass-based layer: R oxide particles | Content of glass layer | Properties: Br (T) | iHc ($MA/m^3$) | BHmax ($kJ/m^3$) | Resistivity (μΩm) | Transverse rupture strength (MPa) |
|---|---|---|---|---|---|---|---|---|---|---|---|
| Present invention | 22 | R—Fe—B-based rare earth magnet | $Dy_2O_3$ | R-rich phase | $Dy_2O_3$ | SiO2—$B_2O_3$—ZnO | 1.17 | 1.50 | 246 | 3650 | 201 |
| Prior art | | powder B | | | $Dy_2O_3$ | | 1.20 | 1.49 | 257 | 56 | 21 |
| Present invention | 23 | R—Fe—B-based rare earth magnet | $Dy_2O_3$ | R-rich phase | $Dy_2O_3$ | $SiO_2$—$B_2O_3$-RrO | 1.17 | 1.02 | 245 | 620 | 117 |
| Prior art | | powder C | | | $Dy_2O_3$ | | 1.21 | 1.01 | 259 | 32 | 25 |
| Present invention | 24 | R—Fe—B-based rare earth magnet | $Dy_2O_3$ | R-rich phase | $Dy_2O_3$ | $SiO_2$—$B_2O_3$—$Al_2O_3$ | 1.06 | 1.50 | 202 | 2230 | 173 |
| Prior art | | powder D | | | $Dy_2O_3$ | | 1.11 | 1.48 | 221 | 50 | 29 |
| Present invention | 25 | R—Fe—B-based rare earth magnet | $Dy_2O_3$ | R-rich phase | $Dy_2O_3$ | $SiO_2$—BaO—$Al_2O_3$ | 1.06 | 1.54 | 201 | 4630 | 230 |
| Prior art | | powder E | | | $Dy_2O_3$ | | 1.12 | 1.52 | 224 | 66 | 36 |

TABLE 7

| Rare earth magnet | | Composition of R—Fe—B-based rare earth magnet layer | High strength and high electrical resistance composite layer: R oxide particle-based mixture layer: R oxide particles | Alloy phase | Glass-based layer: R oxide particles | Content of glass layer | Properties: Br (T) | iHc ($MA/m^3$) | BHmax ($kJ/m^3$) | Resistivity (μΩm) | Transverse rupture strength (MPa) |
|---|---|---|---|---|---|---|---|---|---|---|---|
| Present invention | 26 | R—Fe—B-based rare earth magnet | $Pr_2O_3$ | R-rich phase | $Pr_2O_3$ | $SiO_2$—BaO—$B_2O_3$ | 1.10 | 1.17 | 215 | 3590 | 210 |
| Prior art | | powder F | | | $Pr_2O_3$ | | 1.15 | 1.15 | 235 | 63 | 27 |
| Present invention | 27 | R—Fe—B-based rare earth magnet | $Ho_2O_3$ | R-rich phase | $Ho_2O_3$ | $SiO_2$—BaO—$Li_2O_3$ | 1.06 | 1.13 | 199 | 3630 | 210 |
| Prior art | | powder G | | | $Ho_2O_3$ | | 1.10 | 1.12 | 217 | 72 | 28 |
| Present invention | 28 | R—Fe—B-based rare earth magnet | $Dy_2O_3$ | R-rich phase | $Dy_2O_3$ | $SiO_2$—MgO—$Al_2O_3$ | 0.90 | 1.71 | 145 | 1480 | 175 |
| Prior art | | powder H | | | $Dy_2O_3$ | | 1.02 | 1.69 | 185 | 46 | 23 |
| Present invention | 29 | R—Fe—B-based rare earth magnet | $Nd_2O_3$ | R-rich phase | $Nd_2O_3$ | $SiO_2$—ZnO—BrO | 1.05 | 1.63 | 197 | 1340 | 150 |
| Prior art | | powder I | | | $Nd_2O_3$ | | 1.11 | 1.61 | 220 | 43 | 25 |
| Present invention | 30 | R—Fe—B-based rare earth magnet | $Nd_2O_3$ | R-rich phase | $Nd_2O_3$ | $SiO_2$—$B_2O_3$—ZnO | 1.11 | 1.16 | 220 | 1190 | 149 |
| Prior art | | powder J) | | | $Nd_2O_3$ | | 1.15 | 1.15 | 236 | 36 | 35 |

TABLE 8

| Rare earth magnet | | Composition of R—Fe—B-based rare earth magnet layer | High strength and high electrical resistance composite layer: R oxide particle-based mixture layer: R oxide particles | Alloy phase | Glass-based layer: R oxide particles | Content of glass layer | Properties: Br (T) | iHc ($MA/m^3$) | BHmax ($kJ/m^3$) | Resistivity (μΩm) | Transverse rupture strength (MPa) |
|---|---|---|---|---|---|---|---|---|---|---|---|
| Present invention | 31 | R—Fe—B-based rare earth magnet | $Lu_2O_3$ | R-rich phase | $Lu_2O_3$ | SiO2—$Al_2O_3$-RrO | 1.13 | 0.98 | 228 | 770 | 144 |
| Prior art | | powder K | | | $Lu_2O_3$ | | 1.16 | 0.97 | 238 | 33 | 26 |
| Present invention | 32 | R—Fe—B-based rare earth magnet | $Dy_2O_3$ | R-rich phase | $Dy_2O_3$ | $B_2O_3$—ZnO | 1.19 | 1.84 | 254 | 560 | 122 |
| Prior art | | powder L | | | $Dy_2O_3$ | | 1.21 | 1.83 | 259 | 30 | 34 |
| Present invention | 33 | R—Fe—B-based rare earth magnet | $Dy_2O_3$ | R-rich phase | $Dy_2O_3$ | PbO—$B_2O_3$ | 1.08 | 1.59 | 208 | 1650 | 179 |
| Prior art | | powder M | | | $Dy_2O_3$ | | 1.13 | 1.58 | 226 | 48 | 22 |
| Present invention | 34 | R—Fe—B-based rare earth magnet | $Tb_2O_3$ | R-rich phase | $Tb_2O_3$ | $SiO_2$—$B_2O_3$—PbO | 1.07 | 1.48 | 205 | 1570 | 159 |
| Prior art | | powder N | | | $Tb_2O_3$ | | 1.12 | 1.47 | 223 | 45 | 20 |
| Present invention | 35 | R—Fe—B-based rare earth magnet | $Gd_2O_3$ | R-rich phase | $Gd_2O_3$ | $Al_2O_3$—$B_2O_3$—PbO | 1.12 | 1.14 | 223 | 1090 | 143 |
| Prior art | | powder O | | | $Gd_2O_3$ | | 1.16 | 1.13 | 239 | 41 | 29 |

TABLE 9

| | High strength and high electrical resistance composite layer | | | | | Properties | | | | |
|---|---|---|---|---|---|---|---|---|---|---|
| | Composition of R—Fe—B-based | R oxide particle-based mixture layer | | Glass-based layer | | | | | | Transverse rupture |
| Rare earth magnet | rare earth magnet layer | R oxide particles | Alloy phase | R oxide particles | Content of glass layer | Br (T) | iHc (MA/m$^3$) | BHmax (kJ/m$^3$) | Resistivity (μΩm) | strength (MPa) |
| Present invention 36 | R—Fe—B-based rare earth magnet | $Dy_2O_3$ | R-rich phase | — | $SnO—P_2O_5$ | 1.11 | 1.54 | 221 | 890 | 129 |
| Prior art | powder P | | | $Dy_2O_3$ | | 1.15 | 1.52 | 236 | 37 | 26 |
| Present invention 37 | R—Fe—B-based rare earth magnet | $Pr_2O_3$ | R-rich phase | — | $ZnO—P_2O_5$ | 1.13 | 1.06 | 226 | 1390 | 154 |
| Prior art | powder Q | | | $Pr_2O_3$ | | 1.17 | 1.05 | 245 | 40 | 33 |
| Present invention 38 | R—Fe—B-based rare earth magnet | $Y_2O_3$ | R-rich phase | — | $ZnO—P_2O_5$ | 1.05 | 1.66 | 195 | 1810 | 165 |
| Prior art | powder R | | | $Y_2O_3$ | | 1.10 | 1.65 | 214 | 44 | 26 |
| Present invention 39 | R—Fe—B-based rare earth magnet | $Er_2O_3$ | R-rich phase | — | $CuO—P_2O_5$ | 1.08 | 1.51 | 207 | 1220 | 162 |
| Prior art | powder S | | | $Er_2O_3$ | | 1.13 | 1.50 | 225 | 39 | 36 |
| Present invention 40 | R—Fe—B-based rare earth magnet | $Ho_2O_3$ | R-rich phase | — | $SiO_2—B_2O_3—ZnO$ | 1.12 | 1.40 | 223 | 850 | 117 |
| Prior art | powder T | | | $Ho_2O_3$ | | 1.16 | 1.39 | 238 | 33 | 32 |

From the results shown in Tables 6 through 9, it can be seen that the rare earth magnets 21 through 40 of the present invention have particularly higher strength and higher electrical resistance than the rare earth magnets 21 through 40 of the prior art.

Example 3

R—Fe—B-based rare earth magnet green compact layers having thickness of 4 mm were formed in magnetic field from the R—Fe—B-based rare earth magnet powders A through T shown in Table 1.

R oxide targets made from $Dy_2O_3$, $Pr_2O_3$, $La_2O_3$, $Nd_2O_3$, $CeO_2$, $Tb_2O_3$, $Gd_2O_3$, $Pr_2O_3$, $Y_2O_3$, $Er_2O_3$, and $Sm_2O_3$ were prepared.

Sputtered layers of R oxide having thickness of 3 μm and compositions shown in Tables 10 through 13 were formed on the surface of the R—Fe—B-based rare earth magnet green compact layer by means of a sputtering apparatus.

R oxide powder slurries formed from $Dy_2O_3$, $Pr_2O_3$, $La_2O_3$, $Nd_2O_3$, $CeO_2$, $Tb_2O_3$, $Gd_2O_3$, $Pr_2O_3$, $Y_2O_3$, $Er_2O_3$, and $Sm_2O_3$, and glass powders having compositions shown in Tables 10 through 13 with the average particle size of 2 μm were prepared. The top surface of the sputtered layers of R oxide formed on the R—Fe—B-based rare earth magnet green compact layer was coated with the R oxide powder slurry so as to form the R oxide powder slurry layer. A glass powder slurry was further applied to the R oxide powder slurry layer so as to form a glass powder slurry layer on the R oxide powder slurry layer, thereby making one of the stacked bodies.

Furthermore, the R oxide powder slurry was applied to the top surface of another R—Fe—B-based rare earth magnet green compact layer whereon the sputtered layers of R oxide was formed so as to form R oxide powder slurry layer, thereby making the other stacked body.

The glass powder slurry layer is provided between the stacked bodies so as to prepare a stacked green compact. The stacked green compact was hot-pressed at a temperature of 750° C. under a pressure of 147 MPa, thereby making the rare earth magnets 41 through 60 of the present invention in the form of bulk measuring 10 mm in length, 10 mm in width, and 6.5 mm in height. The rare earth magnets 41 through 60 of the present invention made in this way all showed the constitution shown in FIG. 2 in which the high strength and high electrical resistance composite layer 12 had a structure such that the glass-based layer 16, which had the structure consisting of a glass phase or the R oxide particles dispersed in the glass phase, was provided between the R oxide particle-based mixture layers 17, that had a mixed structure of an R-rich alloy phase which contained 50 atomic % or more of R and the R oxide particles, in contact with the glass-based layer 16, and the R oxide layer 19 was stacked on the surface of the R oxide particle-based mixture layers 17 opposite to the surface thereof that made contact with the glass-based layer 16, while the high strength and high electrical resistance composite layer 12 was provided between the R—Fe—B-based rare earth magnet layers 11, 11.

The rare earth magnets 41 through 60 of the present invention made as described above were polished on the top and bottom surfaces and four side faces thereof. A pair of voltage terminals were applied with a space of 4 mm from each other to the rare earth magnets 41 through 60 of the present invention that were polished, across one R—Fe—B-based rare earth magnet layer to the other R—Fe—B-based rare earth magnet layer of the side face including the high strength and high electrical resistance composite layer while straddling the high strength and high electrical resistance composite layer. A pair of current terminals were applied with a space of 6 mm from each other so as to cross over the pair of voltage terminals. Resistance R=E/I (Ω) was calculated from the voltage drop E (V) across the voltage terminals when a predetermined current I (A) was flown between the current terminals, and resistance was calculated from cross sectional area A (approximately 100 mm$^2$) and the distance d between the terminals (=4 mm) by formula R×A/d, with the results shown in Tables 2 through 5.

Remanence, coercivity and maximum energy product of the rare earth magnets 41 through 60 of the present invention were measured, with the results shown in Tables 10 through 13, then breaking resistance of the rare earth magnets 41 through 60 of the present invention was measured, with the results shown in Tables 13 through 13.

Comparative Example 3

Two stacked bodies having the R oxide powder slurry layers formed by applying the R oxide powder slurry on the top surface of the R—Fe—B-based rare earth magnet green compact layer made in Example 3 were prepared. The two stacked bodies were put together with the R oxide powder slurry layers facing each other so as to form the stacked green compact constituted from the R—Fe—B-based rare earth magnet green compact layer, the R oxide powder slurry layer, the R oxide powder slurry layer and the R—Fe—B-based rare earth magnet green compact layer. The stacked green compact was hot-pressed at a temperature of 750° C. under a pressure of 147 MPa, thereby making the rare earth magnets 41 through 60 of the prior art in the form of bulk constituted from the R—Fe—B-based rare earth magnet layer and the R oxide layer measuring 10 mm in length, 10 mm in width, and 6.5 mm in height.

The rare earth magnets 41 through 60 of the prior art made as described above were polished on the top and bottom surfaces and four side faces thereof. A pair of voltage terminals were applied with a space of 4 mm from each other to the rare earth magnets 41 through 60 of the prior art that were polished, across one R—Fe—B-based rare earth magnet layer to the other R—Fe—B-based rare earth magnet layer of the side face including the R oxide layer while straddling the R oxide layer. A pair of current terminals were applied with a space of 6 mm from each other so as to cross over the pair of voltage terminals. Resistance R=E/I (Ω) was calculated from the voltage drop E (V) across the voltage terminals when a predetermined current I (A) was flown between the current terminals, and resistance was calculated from the cross sectional area A (approximately 100 $mm^2$) and the distance d between the terminals (=4 mm) by formula R×A/d, with the results shown in Tables 10 through 13.

Remanence, coercivity and maximum energy product of the rare earth magnets 41 through 60 of the prior art were measured by the ordinary methods, with the results shown in Tables 2 through 5, then transverse rupture strength of the rare earth magnets 41 through 60 of the prior art were measured, with the results shown in Tables 10 through 13.

TABLE 10

| | | | High strength and high electrical resistance composite layer | | | | | Properties | | | | |
|---|---|---|---|---|---|---|---|---|---|---|---|---|
| | | Composition of R—Fe—B- | R | R oxide particle-based mixture layer | | Glass-based layer | | | | | | Transverse rupture |
| Rare earth magnet | | based rare earth magnet layer | oxide layer | R oxide particles | Alloy phase | R oxide particles | Content of glass layer | Br (T) | iHc (MA/$m^3$) | BHmax (kJ/$m^3$) | Resistivity (μΩm) | strength (MPa) |
| Present invention | 41 | R—Fe—B-based rare earth magnet powder A | $Dy_2O_3$ | $Dy_2O_3$ | R-rich phase | $Dy_2O_3$ | SiO2—$B_2O_3$-RrO | 1.19 | 1.81 | 251 | 570 | 128 |
| Prior art | | | | | $Dy_2O_3$ | | | 1.19 | 1.79 | 251 | 21 | 23 |
| Present invention | 42 | R—Fe—B-based rare earth magnet powder B | $Dy_2O_3$ | $Dy_2O_3$ | R-rich phase | $Dy_2O_3$ | $SiO_2$—$B_2O_3$—ZnO | 1.23 | 1.50 | 267 | 1030 | 145 |
| Prior art | | | | | $Dy_2O_3$ | | | 1.23 | 1.49 | 268 | 24 | 24 |
| Present invention | 43 | R—Fe—B-based rare earth magnet powder C | $Dy_2O_3$ | $Dy_2O_3$ | R-rich phase | $Dy_2O_3$ | $SiO_2$—$B_2O_3$-RrO | 1.24 | 1.02 | 272 | 1970 | 178 |
| Prior art | | | | | $Dy_2O_3$ | | | 1.24 | 1.01 | 273 | 28 | 25 |
| Present invention | 44 | R—Fe—B-based rare earth magnet powder D | $Dy_2O_3$ | $Dy_2O_3$ | R-rich phase | $Dy_2O_3$ | SiO2—$B_2O_3$—$Al_2O_3$ | 1.16 | 1.50 | 240 | 5140 | 255 |
| Prior art | | | | | $Dy_2O_3$ | | | 1.16 | 1.48 | 241 | 45 | 26 |
| Present invention | 45 | R—Fe—B-based rare earth magnet powder E | $Dy_2O_3$ | $Dy_2O_3$ | R-rich phase | $Dy_2O_3$ | SiO2—BaO—$Al_2O_3$ | 1.19 | 1.54 | 250 | 2610 | 195 |
| Prior art | | | | | $Dy_2O_3$ | | | 1.19 | 1.52 | 251 | 38 | 24 |

TABLE 11

| | | | High strength and high electrical resistance composite layer | | | | | Properties | | | | |
|---|---|---|---|---|---|---|---|---|---|---|---|---|
| | | Composition of R—Fe—B- | R | R oxide particle-based mixture layer | | Glass-based layer | | | | | | Transverse rupture |
| Rare earth magnet | | based rare earth magnet layer | oxide layer | R oxide particles | Alloy phase | R oxide particles | Content of glass layer | Br (T) | iHc (MA/$m^3$) | BHmax (kJ/$m^3$) | Resistivity (μΩm) | strength (MPa) |
| Present invention | 46 | R—Fe—B-based rare earth magnet powder F | $Pr_2O_3$ | $Pr_2O_3$ | R-rich phase | $Pr_2O_3$ | $SiO_2$—BaO—$B_2O_3$ | 1.21 | 1.17 | 261 | 3810 | 223 |
| Prior art | | | | | $Pr_2O_3$ | | | 1.21 | 1.15 | 262 | 33 | 27 |
| Present invention | 47 | R—Fe—B-based rare earth magnet powder G | $Ho_2O_3$ | $Ho_2O_3$ | R-rich phase | $Ho_2O_3$ | $SiO_2$—BaO—$Li_2O_3$ | 1.18 | 1.13 | 246 | 650 | 131 |
| Prior art | | | | | $Ho_2O_3$ | | | 1.18 | 1.12 | 246 | 23 | 23 |
| Present invention | 48 | R—Fe—B-based rare earth magnet powder H | $Dy_2O_3$ | $Dy_2O_3$ | R-rich phase | $Dy_2O_3$ | $SiO_2$—MgO—$Al_2O_3$ | 1.15 | 1.71 | 234 | 5740 | 256 |
| Prior art | | | | | $Dy_2O_3$ | | | 1.15 | 1.69 | 236 | 35 | 28 |

TABLE 11-continued

| Rare earth magnet | | Composition of R—Fe—B-based rare earth magnet layer | High strength and high electrical resistance composite layer: R oxide layer | R oxide particle-based mixture layer: R oxide particles | R oxide particle-based mixture layer: Alloy phase | Glass-based layer: R oxide particles | Glass-based layer: Content of glass layer | Properties: Br (T) | iHc (MA/m³) | BHmax (kJ/m³) | Resistivity (μΩm) | Transverse rupture strength (MPa) |
|---|---|---|---|---|---|---|---|---|---|---|---|---|
| Present invention | 49 | R—Fe—B-based rare earth | $Nd_2O_3$ | $Nd_2O_3$ | R-rich phase | $Nd_2O_3$ | $SiO_2$—ZnO—BrO | 1.17 | 1.63 | 245 | 4550 | 236 |
| Prior art | | magnet powder I | | | $Nd_2O_3$ | | | 1.17 | 1.61 | 245 | 50 | 24 |
| Present invention | 50 | R—Fe—B-based rare earth | $Nd_2O_3$ | $Nd_2O_3$ | R-rich phase | $Nd_2O_3$ | $SiO_2$—$B_2O_3$—ZnO | 1.19 | 1.16 | 250 | 2690 | 205 |
| Prior art | | magnet powder J | | | $Nd_2O_3$ | | | 1.19 | 1.15 | 251 | 40 | 24 |

TABLE 12

| Rare earth magnet | | Composition of R—Fe—B-based rare earth magnet layer | High strength and high electrical resistance composite layer: R oxide layer | R oxide particle-based mixture layer: R oxide particles | R oxide particle-based mixture layer: Alloy phase | Glass-based layer: R oxide particles | Glass-based layer: Content of glass layer | Properties: Br (T) | iHc (MA/m³) | BHmax (kJ/m³) | Resistivity (μΩm) | Transverse rupture strength (MPa) |
|---|---|---|---|---|---|---|---|---|---|---|---|---|
| Present invention | 51 | R—Fe—B-based rare earth magnet powder K | $Lu_2O_3$ | $Lu_2O_3$ | R-rich phase | $Lu_2O_3$ | $SiO_2$—$Al_2O_3$-RrO | 1.18 | 0.98 | 245 | 2180 | 186 |
| Prior art | | | | | $Lu_2O_3$ | | | 1.18 | 0.97 | 246 | 25 | 26 |
| Present invention | 52 | R—Fe—B-based rare earth | $Dy_2O_3$ | $Dy_2O_3$ | R-rich phase | $Dy_2O_3$ | $B_2O_3$—ZnO | 1.21 | 1.84 | 260 | 3230 | 211 |
| Prior art | | magnet powder L | | | $Dy_2O_3$ | | | 1.21 | 1.83 | 262 | 43 | 24 |
| Present invention | 53 | R—Fe—B-based rare earth | $Dy_2O_3$ | $Dy_2O_3$ | R-rich phase | $Dy_2O_3$ | PbO—$B_2O_3$ | 1.17 | 1.59 | 244 | 4700 | 243 |
| Prior art | | magnet powder M | | | $Dy_2O_3$ | | | 1.17 | 1.58 | 244 | 58 | 23 |
| Present invention | 54 | R—Fe—B-based rare earth | $Tb_2O_3$ | $Tb_2O_3$ | R-rich phase | $Tb_2O_3$ | $SiO_2$—$B_2O_3$—PbO | 1.16 | 1.48 | 240 | 4020 | 231 |
| Prior art | | magnet powder N | | | $Tb_2O_3$ | | | 1.16 | 1.47 | 241 | 48 | 24 |
| Present invention | 55 | R—Fe—B-based rare earth | $Gd_2O_3$ | $Gd_2O_3$ | R-rich phase | $Gd_2O_3$ | $Al_2O_3$—$B_2O_3$—PbO | 1.20 | 1.14 | 256 | 1940 | 176 |
| Prior art | | magnet powder O | | | $Gd_2O_3$ | | | 1.20 | 1.13 | 257 | 35 | 24 |

TABLE 13

| Rare earth magnet | | Composition of R—Fe—B-based rare earth magnet layer | High strength and high electrical resistance composite layer: R oxide layer | R oxide particle-based mixture layer: R oxide particles | R oxide particle-based mixture layer: Alloy phase | Glass-based layer: R oxide particles | Glass-based layer: Content of glass layer | Properties: Br (T) | iHc (MA/m³) | BHmax (kJ/m³) | Resistivity (μΩm) | Transverse rupture strength (MPa) |
|---|---|---|---|---|---|---|---|---|---|---|---|---|
| Present invention | 56 | R—Fe—B-based rare earth | $Dy_2O_3$ | $Dy_2O_3$ | R-rich phase | — | SnO—$P_2O_5$ | 1.19 | 1.54 | 250 | 1500 | 172 |
| Prior art | | magnet powder P | | | $Dy_2O_3$ | | | 1.19 | 1.52 | 252 | 25 | 25 |
| Present invention | 57 | R—Fe—B-based rare earth | $Pr_2O_3$ | $Pr_2O_3$ | R-rich phase | — | ZnO—$P_2O_5$ | 1.21 | 1.06 | 261 | 2770 | 201 |
| Prior art | | magnet powder Q | | | $Pr_2O_3$ | | | 1.21 | 1.05 | 262 | 38 | 25 |
| Present invention | 58 | R—Fe—B-based rare earth | $Y_2O_3$ | $Y_2O_3$ | R-rich phase | — | ZnO—$P_2O_5$ | 1.13 | 1.66 | 230 | 3030 | 214 |
| Prior art | | magnet powder R | | | $Y_2O_3$ | | | 1.14 | 1.65 | 231 | 35 | 26 |
| Present invention | 59 | R—Fe—B-based rare earth | $Er_2O_3$ | $Er_2O_3$ | R-rich phase | — | CuO—$P_2O_5$ | 1.16 | 1.51 | 240 | 2620 | 193 |
| Prior art | | magnet powder S | | | $Er_2O_3$ | | | 1.16 | 1.50 | 241 | 30 | 26 |
| Present invention | 60 | R—Fe—B-based rare earth | $Ho_2O_3$ | $Ho_2O_3$ | R-rich phase | — | $SiO_2$—$B_2O_3$—ZnO | 1.19 | 1.40 | 251 | 2940 | 204 |
| Prior art | | magnet powder T | | | $Ho_2O_3$ | | | 1.19 | 1.39 | 251 | 38 | 25 |

From the results shown in Tables 10 through 13, it can be seen that the rare earth magnets 41 through 60 of the present invention have particularly higher strength and higher electrical resistance than rare earth magnets 41 through 60 of the prior art.

Example 4

Sputtered layers of R oxide having thickness of 2 μm and compositions shown in Tables 10 through 13 were formed on the surfaces of the R—Fe—B-based rare earth magnet powders A through T that had been subjected to HDDR treatment shown in Table 1 by means of a sputtering apparatus that employed a rotary barrel, by using the R oxide target prepared in Example 1. R oxide powders made of $Dy_2O_3$, $Pr_2O_3$, $La_2O_3$, $Nd_2O_3$, $CeO_2$, $Tb_2O_3$, $Gd_2O_3$, $Pr_2O_3$, $Y_2O_3$, $Er_2O_3$, and $Sm_2O_3$ was adhered onto the layer described above using 0.1% by weight of PVA to a thickness of 2 μm, and glass powders shown in Tables 14 through 17 were further adhered thereon with 0.1% by weight of PVA (polyvinyl alcohol), thereby to prepare oxide-coated R—Fe—B-based rare earth magnet powder. The oxide-coated R—Fe—B-based rare earth magnet powder was subjected to heat treatment at a temperature of 450° C. in vacuum so as to remove the PVA, followed by forming in a magnetic field under a pressure of 49 MPa and hot pressing at a temperature of 730° C. under a pressure of 294 MPa, thereby making the rare earth magnets 61 through 80 of the present invention in the form of bulk measuring 10 mm in length, 10 mm in width, and 7 mm in height. The rare earth magnets 61 through 80 of the present invention had a structure, as shown in FIG. 5, in which the R—Fe—B-based rare earth magnet particles 18 were enclosed with the high strength and high electrical resistance composite layer 12 comprising the glass-based layer 16, which had the structure consisting of the R oxide particles dispersed in glass phase, the R oxide particle-based mixture layers 17 having a mixed structure of an R-rich alloy phase containing 50 atomic % or more of R and the R oxide particles formed on both sides of the glass-based layer 16, and the R oxide layer 19.

The rare earth magnets 61 through 80 of the present invention in the form of bulk made as described above were polished on the surfaces thereof, and resistivity was measured with the results shown in Tables 14 through 17.

Remanence, coercivity, and maximum energy product of the rare earth magnets 61 through 80 of the present invention were measured by the ordinary methods, with the results shown in Tables 14 through 17, then transverse rupture strength of the rare earth magnets 61 through 80 of the present invention were measured, with the results shown in Tables 14 through 17.

Comparative Example 4

Covered powders formed by sputtering of the R oxide layers shown in Tables 14 through 17 on the surface of the R—Fe—B-based rare earth magnet powders made in Example 4 were preliminary formed in a magnetic field under a pressure of 49 MPa, followed by hot pressing at a temperature of 730° C. under a pressure of 294 MPa, thereby making the rare earth magnets 61 through 80 of the prior art having a structure such that the R—Fe—B-based rare earth magnet particles were enclosed with the R oxide layers in the form of bulk measuring 10 mm in length, 10 mm in width, and 7 mm in height.

The rare earth magnets 61 through 80 of the prior art in the form of bulk made as described above were polished on the surfaces thereof, and resistivity was measured with the results shown in Tables 14 through 17.

Remanence, coercivity, and maximum energy product of the rare earth magnets 61 through 80 of the prior art were measured by the ordinary methods, with the results shown in Tables 14 through 17, then transverse rupture strength of the rare earth magnets 61 through 80 of the prior art were measured, with the results shown in Tables 14 through 17.

TABLE 14

| | | | High strength and high electrical resistance composite layer | | | | | Properties | | | | |
|---|---|---|---|---|---|---|---|---|---|---|---|---|
| | | Composition of R—Fe—B- | R | R oxide particle-based mixture layer | | Glass-based layer | | | | | | Transverse rupture |
| Rare earth magnet | | based rare earth magnet layer | oxide layer | R oxide particles | Alloy phase | R oxide particles | Content of glass layer | Br (T) | iHc (MA/m³) | BHmax (kJ/m³) | Resistivity (μΩm) | strength (MPa) |
| Present invention | 61 | R—Fe—B-based rare earth magnet powder A | $Dy_2O_3$ | $Dy_2O_3$ | R-rich phase | $Dy_2O_3$ | $SiO_2$—$B_2O_3$-RrO | 1.16 | 1.81 | 238 | 4070 | 223 |
| Prior art | | | | | $Dy_2O_3$ | | | 1.18 | 1.79 | 246 | 47 | 38 |
| Present invention | 62 | R—Fe—B-based rare earth magnet powder B | $Dy_2O_3$ | $Dy_2O_3$ | R-rich phase | $Dy_2O_3$ | $SiO_2$—$B_2O_3$—ZnO | 1.17 | 1.50 | 245 | 5700 | 238 |
| Prior art | | | | | $Dy_2O_3$ | | | 1.20 | 1.49 | 257 | 56 | 21 |
| Present invention | 63 | R—Fe—B-based rare earth magnet powder C | $Dy_2O_3$ | $Dy_2O_3$ | R-rich phase | $Dy_2O_3$ | $SiO_2$—$B_2O_3$-RrO | 1.17 | 1.02 | 244 | 550 | 142 |
| Prior art | | | | | $Dy_2O_3$ | | | 1.21 | 1.01 | 259 | 32 | 25 |
| Present invention | 64 | R—Fe—B-based rare earth magnet powder D | $Dy_2O_3$ | $Dy_2O_3$ | R-rich phase | $Dy_2O_3$ | $SiO_2$—$B_2O_3$—$Al_2O_3$ | 1.06 | 1.50 | 201 | 3250 | 202 |
| Prior art | | | | | $Dy_2O_3$ | | | 1.11 | 1.48 | 221 | 50 | 29 |
| Present invention | 65 | R—Fe—B-based rare earth magnet powder E | $Dy_2O_3$ | $Dy_2O_3$ | R-rich phase | $Dy_2O_3$ | $SiO_2$—BaO—$Al_2O_3$ | 1.06 | 1.54 | 200 | 7980 | 263 |
| Prior art | | | | | $Dy_2O_3$ | | | 1.12 | 1.52 | 224 | 66 | 36 |

TABLE 15

| | | | High strength and high electrical resistance composite layer | | | | | Properties | | | | |
|---|---|---|---|---|---|---|---|---|---|---|---|---|
| | | Composition of R—Fe—B- | R | R oxide particle-based mixture layer | | Glass-based layer | | | | | | Transverse rupture |
| Rare earth magnet | | based rare earth magnet layer | oxide layer | R oxide particles | Alloy phase | R oxide particles | Content of glass layer | Br (T) | iHc (MA/m³) | BHmax (kJ/m³) | Resistivity (μΩm) | strength (MPa) |
| Present invention | 66 | R—Fe—B-based rare earth | $Pr_2O_3$ | $Pr_2O_3$ | R-rich phase | $Pr_2O_3$ | $SiO_2$—BaO—$B_2O_3$ | 1.10 | 1.17 | 214 | 4910 | 223 |

TABLE 15-continued

| Rare earth magnet | | Composition of R—Fe—B-based rare earth magnet layer | High strength and high electrical resistance composite layer: R oxide layer | R oxide particle-based mixture layer: R oxide particles | R oxide particle-based mixture layer: Alloy phase | Glass-based layer: R oxide particles | Glass-based layer: Content of glass layer | Properties: Br (T) | Properties: iHc (MA/m$^3$) | Properties: BHmax (kJ/m$^3$) | Properties: Resistivity (μΩm) | Properties: Transverse rupture strength (MPa) |
|---|---|---|---|---|---|---|---|---|---|---|---|---|
| Prior art | | magnet powder F | | | $Pr_2O_3$ | | | 1.15 | 1.15 | 235 | 63 | 27 |
| Present invention | 67 | R—Fe—B-based rare earth magnet powder G | $Ho_2O_3$ | $Ho_2O_3$ | R-rich phase | $Ho_2O_3$ | $SiO_2$—BaO—$Li_2O_3$ | 1.06 | 1.13 | 198 | 6430 | 249 |
| Prior art | | | | | $Ho_2O_3$ | | | 1.10 | 1.12 | 217 | 72 | 28 |
| Present invention | 68 | R—Fe—B-based rare earth magnet powder H | $Dy_2O_3$ | $Dy_2O_3$ | R-rich phase | $Dy_2O_3$ | $SiO_2$—MgO—$Al_2O_3$ | 0.90 | 1.71 | 143 | 2800 | 189 |
| Prior art | | | | | $Dy_2O_3$ | | | 1.02 | 1.69 | 185 | 46 | 23 |
| Present invention | 69 | R—Fe—B-based rare earth | $Nd_2O_3$ | $Nd_2O_3$ | R-rich phase | $Nd_2O_3$ | $SiO_2$—ZnO—BrO | 1.05 | 1.63 | 196 | 1830 | 179 |
| Prior art | | magnet powder I | | | $Nd_2O_3$ | | | 1.11 | 1.61 | 220 | 43 | 25 |
| Present invention | 70 | R—Fe—B-based rare earth | $Nd_2O_3$ | $Nd_2O_3$ | R-rich phase | $Nd_2O_3$ | $SiO_2$—$B_2O_3$—ZnO | 1.11 | 1.16 | 219 | 1170 | 167 |
| Prior art | | magnet powder J | | | $Nd_2O_3$ | | | 1.15 | 1.15 | 236 | 36 | 35 |

TABLE 16

| Rare earth magnet | | Composition of R—Fe—B-based rare earth magnet layer | High strength and high electrical resistance composite layer: R oxide layer | R oxide particle-based mixture layer: R oxide particles | R oxide particle-based mixture layer: Alloy phase | Glass-based layer: R oxide particles | Glass-based layer: Content of glass layer | Properties: Br (T) | Properties: iHc (MA/m$^3$) | Properties: BHmax (kJ/m$^3$) | Properties: Resistivity (μΩm) | Properties: Transverse rupture strength (MPa) |
|---|---|---|---|---|---|---|---|---|---|---|---|---|
| Present invention | 71 | R—Fe—B-based rare earth magnet powder K | $Lu_2O_3$ | $Lu_2O_3$ | R-rich phase | $Lu_2O_3$ | $SiO_2$—$Al_2O_3$-RrO | 1.13 | 0.98 | 227 | 1350 | 165 |
| Prior art | | | | | $Lu_2O_3$ | | | 1.16 | 0.97 | 238 | 33 | 26 |
| Present invention | 72 | R—Fe—B-based rare earth | $Dy_2O_3$ | $Dy_2O_3$ | R-rich phase | $Dy_2O_3$ | $B_2O_3$—ZnO | 1.19 | 1.84 | 254 | 840 | 136 |
| Prior art | | magnet powder L | | | $Dy_2O_3$ | | | 1.21 | 1.83 | 259 | 30 | 34 |
| Present invention | 73 | R—Fe—B-based rare earth | $Dy_2O_3$ | $Dy_2O_3$ | R-rich phase | $Dy_2O_3$ | PbO—$B_2O_3$ | 1.08 | 1.59 | 207 | 2980 | 205 |
| Prior art | | magnet powder M | | | $Dy_2O_3$ | | | 1.13 | 1.58 | 226 | 48 | 22 |
| Present invention | 74 | R—Fe—B-based rare earth | $Tb_2O_3$ | $Tb_2O_3$ | R-rich phase | $Tb_2O_3$ | $SiO_2$—$B_2O_3$—PbO | 1.07 | 1.48 | 204 | 2310 | 196 |
| Prior art | | magnet powder N | | | $Tb_2O_3$ | | | 1.12 | 1.47 | 223 | 45 | 20 |
| Present invention | 75 | R—Fe—B-based rare earth | $Gd_2O_3$ | $Gd_2O_3$ | R-rich phase | $Gd_2O_3$ | $Al_2O_3$—$B_2O_3$—PbO | 1.12 | 1.14 | 222 | 1430 | 176 |
| Prior art | | magnet powder O | | | $Gd_2O_3$ | | | 1.16 | 1.13 | 239 | 41 | 29 |

TABLE 17

| Rare earth magnet | | Composition of R—Fe—B-based rare earth magnet layer | High strength and high electrical resistance composite layer: R oxide layer | R oxide particle-based mixture layer: R oxide particles | R oxide particle-based mixture layer: Alloy phase | Glass-based layer: R oxide particles | Glass-based layer: Content of glass layer | Properties: Br (T) | Properties: iHc (MA/m$^3$) | Properties: BHmax (kJ/m$^3$) | Properties: Resistivity (μΩm) | Properties: Transverse rupture strength (MPa) |
|---|---|---|---|---|---|---|---|---|---|---|---|---|
| Present invention | 76 | R—Fe—B-based rare earth | $Dy_2O_3$ | $Dy_2O_3$ | R-rich phase | — | SnO—$P_2O_5$ | 1.11 | 1.54 | 220 | 1180 | 151 |
| Prior art | | magnet powder P | | | $Dy_2O_3$ | | | 1.15 | 1.52 | 236 | 37 | 26 |
| Present invention | 77 | R—Fe—B-based rare earth | $Pr_2O_3$ | $Pr_2O_3$ | R-rich phase | — | ZnO—$P_2O_5$ | 1.13 | 1.06 | 225 | 1950 | 184 |
| Prior art | | magnet powder Q | | | $Pr_2O_3$ | | | 1.17 | 1.05 | 245 | 40 | 33 |
| Present invention | 78 | R—Fe—B-based rare earth | $Y_2O_3$ | $Y_2O_3$ | R-rich phase | — | ZnO—$P_2O_5$ | 1.05 | 1.66 | 195 | 2780 | 189 |
| Prior art | | magnet powder R | | | $Y_2O_3$ | | | 1.10 | 1.65 | 214 | 44 | 26 |
| Present invention | 79 | R—Fe—B-based rare earth | $Er_2O_3$ | $Er_2O_3$ | R-rich phase | — | CuO—$P_2O_5$ | 1.08 | 1.51 | 206 | 2110 | 177 |
| Prior art | | magnet powder S | | | $Er_2O_3$ | | | 1.13 | 1.50 | 225 | 39 | 36 |

TABLE 17-continued

| | | | High strength and high electrical resistance composite layer | | | | | Properties | | | | |
|---|---|---|---|---|---|---|---|---|---|---|---|---|
| | | Composition of R—Fe—B- | R | R oxide particle-based mixture layer | | Glass-based layer | | | | | | Transverse rupture |
| Rare earth magnet | | based rare earth magnet layer | oxide layer | R oxide particles | Alloy phase | R oxide particles | Content of glass layer | Br (T) | iHc ($MA/m^3$) | BHmax ($kJ/m^3$) | Resistivity (μΩm) | strength (MPa) |
| Present invention | 80 | R—Fe—B-based rare earth | $Ho_2O_3$ | $Ho_2O_3$ | R-rich phase | — | $SiO_2$—$B_2O_3$—ZnO | 1.12 | 1.40 | 222 | 700 | 147 |
| Prior art | | magnet powder T | | | $Ho_2O_3$ | | | 1.16 | 1.39 | 238 | 33 | 32 |

From the results shown in Tables 14 through 17, it can be seen that the rare earth magnets 61 through 80 of the present invention have particularly higher strength and higher electrical resistance than the rare earth magnets 61 through 80 of the prior art.

Example 5

R—Fe—B-based rare earth magnet green compact layers having thickness of 3 mm were formed in a magnetic field from the R—Fe—B-based rare earth magnet powder A through T shown in Table 1.

Rare earth element oxide targets made from $Dy_2O_3$, $Pr_2O_3$, $La_2O_3$, $Nd_2O_3$, $CeO_2$, $Tb_2O_3$, $Gd_2O_3$, $Pr_2O_3$, $Y_2O_3$, $Er_2O_3$, and $Sm_2O_3$ were prepared. Sputtered layers of oxide having thickness of 5 μm were formed on the surface of the R—Fe—B-based rare earth magnet green compact layer by using the rare earth oxide target, thereby making the stacked body comprising the R—Fe—B-based rare earth magnet green compact layer and the R oxide layer.

The glass powders having compositions shown in Tables 18 through 21 with the average particle size of 2 μm were prepared. A plurality of the stacked bodies were stacked so as to provided the glass powder layer between the R oxide layers of the stacked bodies facing each other, thereby making a plurality of stacked green compacts each constituted from the R—Fe—B-based rare earth magnet green compact layer, R oxide layer, glass powder layer, R oxide layer, and the R—Fe—B-based rare earth magnet green compact layer. The stacked green compact was hot-pressed at a temperature of 750° C. under a pressure of 147 MPa, thereby making the rare earth magnets 81 through 100 of the present invention in the form of bulk measuring 10 mm in length, 10 mm in width, and 6.5 mm in height, comprising the high strength and high electrical resistance composite layer that was constituted from the R—Fe—B-based rare earth magnet layer having a composition shown in Tables 18 through 21, the R oxide layer having composition shown in Tables 18 through 21 and the glass layer having composition shown in Tables 18 through 21.

The rare earth magnets 81 through 100 of the present invention made as described above were polished on the top and bottom surfaces and four side faces thereof. A pair of voltage terminals were applied with a space of 4 mm from each other to the rare earth magnets 81 through 100 of the present invention that were polished, across one R—Fe—B-based rare earth magnet layer to the other R—Fe—B-based rare earth magnet layer of the side face that included the high strength and high electrical resistance composite layer while straddling the high strength and high electrical resistance composite layer. A pair of current terminals were applied with a space of 6 mm from each other so as to cross over the pair of voltage terminals. Resistance R=E/I (Ω) was calculated from the voltage drop E (V) across the voltage terminals when a predetermined current I (A) was flown between the current terminals, and resistance was calculated from the cross sectional area A (approximately 100 $mm^2$) and the distance d between the terminals (=4 mm) by formula R×A/d, with the results shown in Tables 18 through 21. Remanence, coercivity and maximum energy product of the rare earth magnets 81 through 100 of the present invention were measured, with the results shown in Tables 18 through 21, then transverse rupture strength of the rare earth magnets 81 through 100 of the present invention were measured, with the results shown in Tables 18 through 21.

Comparative Example 5

A plurality of stacked bodies comprising the R—Fe—B-based rare earth magnet green compact layer and the R oxide layers made in Example 5 were stacked so that the R oxide layers of the stacked bodies face each other, thereby making a plurality of stacked green compacts each constituted from the R—Fe—B-based rare earth magnet powder green compact layer and the R oxide layers. The stacked green compact was hot-pressed at a temperature of 750° C. under a pressure of 147 MPa, thereby making the rare earth magnets 81 through 100 of the prior art in the form of bulk constituted from the R—Fe—B-based rare earth magnet layer having compositions shown in Tables 18 through 21 and the R oxide layer having compositions shown in Tables 18 through 21 stacked one on another, measuring 10 mm in length, 10 mm in width, and 6.5 mm in height.

The rare earth magnets 81 through 100 of the prior art made as described above were polished on the top and bottom surfaces and four side faces thereof. A pair of voltage terminals were applied with a space of 4 mm from each other to the rare earth magnets 81 through 100 of the present invention that were polished, across one R—Fe—B-based rare earth magnet layer to the other R—Fe—B-based rare earth magnet layer of the side face that included the R oxide layer while straddling the R oxide layer. A pair of current terminals were applied with a space of 6 mm from each other so as to cross over the pair of voltage terminals. Resistance R=E/I (Ω) was calculated from the voltage drop E (V) across the voltage terminals when a predetermined current I (A) was flown between the current terminals, and resistance was calculated from the cross sectional area A (approximately 100 $mm^2$) and the distance d between the terminals (=4 mm) by formula R×A/d, with the results shown in Tables 18 through 21.

Remanence, coercivity, and maximum energy product of the rare earth magnets 81 through 100 of the present invention were measured by the ordinary methods, with the results shown in Tables 18 through 21, then transverse rupture strength of the rare earth magnets 81 through 100 of the present invention were measured, with the results shown in Tables 18 through 21. Resistivity was measured by 4-probe method, with the results shown in Tables 18 through 21.

Remanence, coercivity and maximum energy product of the rare earth magnets 81 through 100 of the prior art were measured by the ordinary methods, with the results shown in Tables 18 through 21, then transverse rupture strength of the rare earth magnets 81 through 100 of the prior art were measured, with the results shown in Tables 18 through 21.

TABLE 18

| Rare earth magnet | | Composition of R—Fe—B-based rare earth magnet layer | High strength and high electrical resistance composite layer: R oxide layer | Glass layer | Properties: Br (T) | iHc ($MA/m^3$) | BHmax ($kJ/m^3$) | Resistivity (μΩm) | Transverse rupture strength (MPa) |
|---|---|---|---|---|---|---|---|---|---|
| Present invention | 81 | R—Fe—B-based rare earth magnet | $Dy_2O_3$ | $SiO_2$—BaO—$Al_2O_3$ | 1.19 | 1.54 | 251 | 345 | 120 |
| Prior art | | powder A | | — | 1.19 | 1.52 | 251 | 38 | 24 |
| Present invention | 82 | R—Fe—B-based rare earth magnet | $Pr_2O_3$ | $SiO_2$—BaO—$B_2O_3$ | 1.21 | 1.17 | 261 | 390 | 195 |
| Prior art | | powder B | | — | 1.21 | 1.15 | 262 | 33 | 27 |
| Present invention | 83 | R—Fe—B-based rare earth magnet | $Ho_2O_3$ | $SiO_2$—BaO—$Li_2O_3$ | 1.18 | 1.13 | 246 | 225 | 90 |
| Prior art | | powder C | | — | 1.18 | 1.12 | 246 | 23 | 23 |
| Present invention | 84 | R—Fe—B-based rare earth magnet | $Dy_2O_3$ | $SiO_2$—MgO—$Al_2O_3$ | 1.15 | 1.71 | 234 | 450 | 240 |
| Prior art | | powder D | | — | 1.15 | 1.69 | 236 | 35 | 28 |
| Present invention | 85 | R—Fe—B-based rare earth magnet | $Nd_2O_3$ | $SiO_2$—ZnO-RrO | 1.17 | 1.63 | 244 | 420 | 120 |
| Prior art | | powder E | | — | 1.17 | 1.61 | 245 | 50 | 24 |

TABLE 19

| Rare earth magnet | | Composition of R—Fe—B-based rare earth magnet layer | High strength and high electrical resistance composite layer: R oxide layer | Glass layer | Properties: Br (T) | iHc ($MA/m^3$) | BHmax ($kJ/m^3$) | Resistivity (μΩm) | Transverse rupture strength (MPa) |
|---|---|---|---|---|---|---|---|---|---|
| Present invention | 86 | R—Fe—B-based rare earth magnet | $Nd_2O_3$ | $SiO_2$—$B_2O_3$—ZnO | 1.19 | 1.16 | 251 | 360 | 120 |
| Prior art | | powder F | | — | 1.19 | 1.15 | 251 | 40 | 24 |
| Present invention | 87 | R—Fe—B-based rare earth magnet | $Lu_2O_3$ | $SiO_2$—$Al_2O_3$-RrO | 1.17 | 0.98 | 245 | 330 | 180 |
| Prior art | | powder G | | — | 1.18 | 0.97 | 246 | 25 | 26 |
| Present invention | 88 | R—Fe—B-based rare earth magnet | $Dy_2O_3$ | $B_2O_3$—ZnO | 1.21 | 1.84 | 261 | 375 | 120 |
| Prior art | | powder H | | — | 1.21 | 1.83 | 262 | 43 | 24 |
| Present invention | 89 | R—Fe—B-based rare earth magnet | $Dy_2O_3$ | PbO—$B_2O_3$ | 1.17 | 1.59 | 244 | 435 | 90 |
| Prior art | | powder I | | — | 1.17 | 1.58 | 245 | 58 | 23 |
| Present invention | 90 | R—Fe—B-based rare earth magnet | $Tb_2O_3$ | $SiO_2$—$B_2O_3$—PbO | 1.16 | 1.48 | 240 | 405 | 120 |
| Prior art | | powder J | | — | 1.16 | 1.47 | 241 | 48 | 24 |

TABLE 20

| Rare earth magnet | | Composition of R—Fe—B-based rare earth magnet layer | High strength and high electrical resistance composite layer: R oxide layer | Glass layer | Properties: Br (T) | iHc ($MA/m^3$) | BHmax ($kJ/m^3$) | Resistivity (μΩm) | Transverse rupture strength (MPa) |
|---|---|---|---|---|---|---|---|---|---|
| Present invention | 91 | R—Fe—B-based rare earth magnet | $Gd_2O_3$ | $Al_2O_3$—$B_2O_3$—PbO | 1.20 | 1.14 | 256 | 315 | 105 |
| Prior art | | powder K | | — | 1.20 | 1.13 | 257 | 35 | 24 |
| Present invention | 92 | R—Fe—B-based rare earth magnet | $Dy_2O_3$ | SnO—$P_2O_5$ | 1.19 | 1.54 | 251 | 300 | 150 |
| Prior art | | powder L | | — | 1.19 | 1.52 | 252 | 25 | 25 |
| Present invention | 93 | R—Fe—B-based rare earth magnet | $Pr_2O_3$ | ZnO—$P_2O_5$ | 1.21 | 1.06 | 262 | 360 | 135 |
| Prior art | | powder M | | — | 1.21 | 1.05 | 262 | 38 | 25 |
| Present invention | 94 | R—Fe—B-based rare earth magnet | $Y_2O_3$ | ZnO—$P_2O_5$ | 1.14 | 1.66 | 230 | 375 | 165 |
| Prior art | | powder N | | — | 1.14 | 1.65 | 231 | 35 | 26 |
| Present invention | 95 | R—Fe—B-based rare earth magnet | $Er_2O_3$ | CuO—$P_2O_5$ | 1.16 | 1.51 | 240 | 345 | 165 |
| Prior art | | powder O | | — | 1.16 | 1.50 | 241 | 30 | 26 |

TABLE 20

| Rare earth magnet | | Composition of R—Fe—B-based rare earth magnet layer | High strength and high electrical resistance composite layer: R oxide layer | Glass layer | Properties: Br (T) | iHc (MA/m³) | BHmax (kJ/m³) | Resistivity (μΩm) | Transverse rupture strength (MPa) |
|---|---|---|---|---|---|---|---|---|---|
| Present invention | 96 | R—Fe—B-based rare earth magnet | $Ho_2O_3$ | $SiO_2$—$B_2O_3$—ZnO | 1.19 | 1.40 | 251 | 360 | 135 |
| Prior art | | powder P | | — | 1.19 | 1.39 | 251 | 38 | 25 |
| Present invention | 97 | R—Fe—B-based rare earth magnet | $Dy_2O_3$ | $SiO_2$—$B_2O_3$-RrO | 1.19 | 1.81 | 250 | 593 | 134 |
| Prior art | | powder Q | | — | 1.19 | 1.79 | 251 | 21 | 23 |
| Present invention | 98 | R—Fe—B-based rare earth magnet | $Dy_2O_3$ | $SiO_2$—$B_2O_3$—ZnO | 1.22 | 1.50 | 266 | 667 | 149 |
| Prior art | | powder R | | — | 1.23 | 1.49 | 268 | 24 | 24 |
| Present invention | 99 | R—Fe—B-based rare earth magnet | $Dy_2O_3$ | $SiO_2$—$B_2O_3$-RrO | 1.24 | 1.02 | 273 | 315 | 150 |
| Prior art | | powder S | | — | 1.24 | 1.01 | 273 | 28 | 25 |
| Present invention | 100 | R—Fe—B-based rare earth magnet | $Dy_2O_3$ | $SiO_2$—$B_2O_3$—$Al_2O_3$ | 1.16 | 1.50 | 240 | 450 | 180 |
| Prior art | | powder T | | — | 1.16 | 1.48 | 241 | 45 | 26 |

From the results shown in Tables 18 through 21, it can be seen that the rare earth magnets 81 through 100 of the present invention have particularly higher strength and higher electrical resistance than the rare earth magnets 81 through 100 of the prior art.

Example 6

R oxide layer having thickness of 3 μm and compositions shown in Tables 22 through 25 were formed on the surfaces of the R—Fe—B-based rare earth magnet powders A through T having the average particle size of 300 μm that had been subjected to HDDR treatment shown in Table 1 by means of a powder coating sputtering apparatus, thereby to prepare oxide-coated R—Fe—B-based rare earth magnet powder.

The oxide-coated R—Fe—B-based rare earth magnet powder having the R oxide layer formed on the surface thereof was mixed with glass powders having compositions shown in Tables 22 through 25, all having the average particle size of 0.8 μm, and the mixed powder was formed preliminarily in a magnetic field under a pressure of 49 MPa and was then hot-pressed at a temperature of 730° C. under a pressure of 294 MPa, thereby making the rare earth magnets 101 through 120 of the present invention in the form of bulk measuring 10 mm in length, 10 mm in width, and 7 mm in height of a structure such that the R—Fe—B-based rare earth magnet particles having compositions shown in Tables 22 through 25 were enclosed with the high strength and high electrical resistance composite layer comprising the R oxide layer and the glass layer.

The rare earth magnets 101 through 120 of the present invention in the form of bulk made as described above were polished on the surfaces thereof, and resistivity was measured with the results shown in Tables 22 through 25.

Remanence, coercivity, and maximum energy product of the rare earth magnets 101 through 120 of the present invention were measured by the ordinary methods, with the results shown in Tables 22 through 25, then transverse rupture strength of the rare earth magnets 101 through 120 of the present invention were measured, with the results shown in Tables 22 through 25.

Comparative Example 6

The oxide-coated R—Fe—B-based rare earth magnet powder made in Example 6 having the R oxide layer 3 μm in thickness formed on the surface thereof was subjected to preliminary forming in a magnetic field under a pressure of 49 MPa and was then subjected to hot pressing at a temperature of 730° C. under a pressure of 294 MPa, thereby making the rare earth magnets 101 through 120 of the prior art in the form of bulk measuring 10 mm in length, 10 mm in width, and 7 mm in height having a structure such that the R—Fe—B-based rare earth magnet particles were enclosed with the R oxide layers.

The rare earth magnets 101 through 120 of the prior art in the form of bulk made as described above were polished on the surfaces thereof, and resistivity was measured with the results shown in Tables 22 through 25.

Remanence, coercivity, and maximum energy product of the rare earth magnets 101 through 120 of the prior art were measured by the ordinary methods, with the results shown in Tables 22 through 25, then transverse rupture strength of the rare earth magnets 101 through 120 of the prior art were measured, with the results shown in Tables 22 through 25.

TABLE 22

| Rare earth magnet | | Composition of R—Fe—B-based rare earth magnet layer | High strength and high electrical resistance composite layer: R oxide layer | Glass layer | Properties: Br (T) | iHc (MA/m³) | BHmax (kJ/m³) | Resistivity (μΩm) | Transverse rupture strength (MPa) |
|---|---|---|---|---|---|---|---|---|---|
| Present invention | 101 | R—Fe—B-based rare earth magnet | $Dy_2O_3$ | $SiO_2$—BaO—$Al_2O_3$ | 1.11 | 1.54 | 218 | 1125 | 222 |
| Prior art | | powder A | | — | 1.12 | 1.52 | 224 | 66 | 36 |
| Present invention | 102 | R—Fe—B-based rare earth magnet | $Pr_2O_3$ | $SiO_2$—BaO—$B_2O_3$ | 1.14 | 1.17 | 231 | 390 | 137 |
| Prior art | | powder B | | — | 1.15 | 1.15 | 235 | 63 | 27 |
| Present invention | 103 | R—Fe—B-based rare earth magnet | $Ho_2O_3$ | $SiO_2$—BaO—$Li_2O_3$ | 1.10 | 1.13 | 215 | 1065 | 87 |

TABLE 22-continued

| Rare earth magnet | | Composition of R—Fe—B-based rare earth magnet layer | High strength and high electrical resistance composite layer: R oxide layer | Glass layer | Properties: Br (T) | iHc (MA/m³) | BHmax (kJ/m³) | Resistivity (μΩm) | Transverse rupture strength (MPa) |
|---|---|---|---|---|---|---|---|---|---|
| Prior art | | powder C | | — | 1.10 | 1.12 | 217 | 72 | 28 |
| Present invention | 104 | R—Fe—B-based rare earth magnet | $Dy_2O_3$ | $SiO_2$—MgO—$Al_2O_3$ | 0.97 | 1.71 | 171 | 825 | 196 |
| Prior art | | powder D | | — | 1.02 | 1.69 | 185 | 46 | 23 |
| Present invention | 105 | R—Fe—B-based rare earth magnet | $Nd_2O_3$ | $SiO_2$—ZnO-RrO | 1.10 | 1.63 | 214 | 735 | 146 |
| Prior art | | powder E | | — | 1.11 | 1.61 | 220 | 43 | 25 |

TABLE 23

| Rare earth magnet | | Composition of R—Fe—B-based rare earth magnet layer | High strength and high electrical resistance composite layer: R oxide layer | Glass layer | Properties: Br (T) | iHc (MA/m³) | BHmax (kJ/m³) | Resistivity (μΩm) | Transverse rupture strength (MPa) |
|---|---|---|---|---|---|---|---|---|---|
| Present invention | 106 | R—Fe—B-based rare earth magnet | $Nd_2O_3$ | $SiO_2$—$B_2O_3$—ZnO | 1.14 | 1.16 | 231 | 375 | 179 |
| Prior art | | powder F | | — | 1.15 | 1.15 | 236 | 36 | 35 |
| Present invention | 107 | R—Fe—B-based rare earth magnet | $Lu_2O_3$ | $SiO_2$—$Al_2O_3$-RrO | 1.15 | 0.98 | 234 | 660 | 220 |
| Prior art | | powder G | | — | 1.16 | 0.97 | 238 | 33 | 26 |
| Present invention | 108 | R—Fe—B-based rare earth magnet | $Dy_2O_3$ | $B_2O_3$—ZnO | 1.20 | 1.84 | 257 | 585 | 182 |
| Prior art | | powder H | | — | 1.21 | 1.83 | 259 | 30 | 34 |
| Present invention | 109 | R—Fe—B-based rare earth magnet | $Dy_2O_3$ | PbO—$B_2O_3$ | 1.11 | 1.59 | 221 | 840 | 187 |
| Prior art | | powder I | | — | 1.13 | 1.58 | 226 | 48 | 22 |
| Present invention | 110 | R—Fe—B-based rare earth magnet | $Tb_2O_3$ | $SiO_2$—$B_2O_3$—PbO | 1.10 | 1.48 | 217 | 810 | 204 |
| Prior art | | powder J | | — | 1.12 | 1.47 | 223 | 45 | 20 |

TABLE 24

| Rare earth magnet | | Composition of R—Fe—B-based rare earth magnet layer | High strength and high electrical resistance composite layer: R oxide layer | Glass layer | Properties: Br (T) | iHc (MA/m³) | BHmax (kJ/m³) | Resistivity (μΩm) | Transverse rupture strength (MPa) |
|---|---|---|---|---|---|---|---|---|---|
| Present invention | 111 | R—Fe—B-based rare earth magnet | $Gd_2O_3$ | $Al_2O_3$—$B_2O_3$—PbO | 1.15 | 1.14 | 235 | 705 | 151 |
| Prior art | | powder K | | — | 1.16 | 1.13 | 239 | 41 | 29 |
| Present invention | 112 | R—Fe—B-based rare earth magnet | $Dy_2O_3$ | SnO—$P_2O_5$ | 1.14 | 1.54 | 232 | 645 | 137 |
| Prior art | | powder L | | — | 1.15 | 1.52 | 236 | 37 | 26 |
| Present invention | 113 | R—Fe—B-based rare earth magnet | $Pr_2O_3$ | ZnO—$P_2O_5$ | 1.16 | 1.06 | 238 | 750 | 214 |
| Prior art | | powder M | | — | 1.17 | 1.05 | 245 | 40 | 33 |
| Present invention | 114 | R—Fe—B-based rare earth magnet | $Y_2O_3$ | ZnO—$P_2O_5$ | 1.08 | 1.66 | 207 | 825 | 233 |
| Prior art | | powder N | | — | 1.10 | 1.65 | 214 | 44 | 26 |
| Present invention | 115 | R—Fe—B-based rare earth magnet | $Er_2O_3$ | CuO—$P_2O_5$ | 1.11 | 1.51 | 218 | 765 | 247 |
| Prior art | | powder O | | — | 1.13 | 1.50 | 225 | 39 | 36 |

TABLE 25

| Rare earth magnet | | Composition of R—Fe—B-based rare earth magnet layer | High strength and high electrical resistance composite layer: R oxide layer | Glass layer | Properties: Br (T) | iHc (MA/m³) | BHmax (kJ/m³) | Resistivity (μΩm) | Transverse rupture strength (MPa) |
|---|---|---|---|---|---|---|---|---|---|
| Present invention | 116 | R—Fe—B-based rare earth magnet | $Ho_2O_3$ | $SiO_2$—$B_2O_3$—ZnO | 1.14 | 1.40 | 233 | 600 | 151 |
| Prior art | | powder P | | — | 1.16 | 1.39 | 238 | 33 | 32 |

TABLE 25-continued

| Rare earth magnet | | Composition of R—Fe—B-based rare earth magnet layer | High strength and high electrical resistance composite layer | | Properties | | | | |
|---|---|---|---|---|---|---|---|---|---|
| | | | R oxide layer | Glass layer | Br (T) | iHc ($MA/m^3$) | BHmax ($kJ/m^3$) | Resistivity (μΩm) | Transverse rupture strength (MPa) |
| Present invention | 117 | R—Fe—B-based rare earth magnet | $Dy_2O_3$ | $SiO_2$—$B_2O_3$-RrO | 1.17 | 1.81 | 244 | 855 | 221 |
| Prior art | | powder Q | | — | 1.18 | 1.79 | 246 | 47 | 38 |
| Present invention | 118 | R—Fe—B-based rare earth magnet | $Dy_2O_3$ | $SiO_2$—$B_2O_3$—ZnO | 1.19 | 1.50 | 254 | 1005 | 249 |
| Prior art | | powder R | | — | 1.20 | 1.49 | 257 | 56 | 21 |
| Present invention | 119 | R—Fe—B-based rare earth magnet | $Dy_2O_3$ | $SiO_2$—$B_2O_3$-RrO | 1.20 | 1.02 | 255 | 555 | 121 |
| Prior art | | powder S | | — | 1.21 | 1.01 | 259 | 32 | 25 |
| Present invention | 120 | R—Fe—B-based rare earth magnet | $Dy_2O_3$ | $SiO_2$—$B_2O_3$—$Al_2O_3$ | 1.10 | 1.50 | 215 | 885 | 210 |
| Prior art | | powder T | | — | 1.11 | 1.48 | 221 | 50 | 29 |

From the results shown in Tables 23 through 25, it can be seen that the rare earth magnets 101 through 120 of the present invention have particularly higher strength and higher electrical resistance than the rare earth magnets 101 through 120 of the prior art.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rare earth magnet formed by stacking a composite layer and an R—Fe—B-based rare earth magnet layer, wherein R represents one or more kind of rare earth element including Y, and the composite layer comprises a glass-based layer having a glass phase or a structure of R oxide particles dispersed in a glass phase, and R oxide particle-based mixture layers that are formed on both sides of the glass-based layer and which contain an R-rich alloy phase which contains 50 atomic % or more of R in a grain boundary of the R oxide particles.

2. The rare earth magnet according to claim 1, wherein the composite layer further comprises an R oxide layer formed on the surface of the R oxide particle-based mixture layer opposite to a surface thereof that makes contact with the glass-based layer.

3. The rare earth magnet according to claim 2, wherein R of the R oxide layer contained in the composite layer is one or more selected from the group consisting of Y, Gd, Tb, Dy, Ho, Er, Tm, Yb, and Lu.

4. The rare earth magnet according to claim 1, wherein the R—Fe—B-based rare earth magnet layer has a composition such as 5 to 20 atomic % of R and 3 to 20 atomic % of B, with the balance consisting of Fe and inevitable impurities.

5. The rare earth magnet according to claim 1, wherein the R—Fe—B-based rare earth magnet layer has a composition such as 5 to 20 atomic % of R, 3 to 20 atomic % of B, and 0.001 to 5 atomic % of M, wherein M represents one or more selected from the group consisting of Ga, Zr, Nb, Mo, Hf, Ta, W, Ni, Al, Ti, V, Cu, Cr, Ge, C, and Si, with the balance consisting of Fe and inevitable impurities.

6. The rare earth magnet according to claim 1, wherein the R—Fe—B-based rare earth magnet layer has a composition such as 5 to 20 atomic % of R, 0.1 to 50 atomic % of Co, and 3 to 20 atomic % of B, with the balance consisting of Fe and inevitable impurities.

7. The rare earth magnet according to claim 1, wherein the R—Fe—B-based rare earth magnet layer has a composition such as 5 to 20 atomic % of R, 0.1 to 50 atomic % of Co, 3 to 20 atomic % of B, and 0.001 to 5 atomic % of M, wherein M represents one or more selected from the group consisting of Ga, Zr, Nb, Mo, Hf, Ta, W, Ni, Al, Ti, V, Cu, Cr, Ge, C, and Si, with the balance consisting of Fe and inevitable impurities.

8. The R—Fe—B-based rare earth magnet, wherein the R—Fe—B-based rare earth magnet layer according to claim 1 is a magnetically anisotropic HDDR magnetic layer having a recrystallization texture comprising adjoining recrystallized grains containing an $R_2Fe_{14}B$ type intermetallic compound phase having a substantially tetragonal structure as a main phase, while the recrystallization texture has a fundamental structure having a constitution such that 50% by volume or more of the recrystallized grains have a shape such that a ratio b/a of the minimum grain size a and the maximum grain size b of the recrystallized grain is less than 2, and the average size of the recrystallized grains is in a range from 0.05 to 5 μm.

9. A rare earth magnet comprising: a composite layer that is formed by stacking R oxide layers on both sides of a glass layer and R—Fe—B-based rare earth magnet layers, wherein the composite layer is provided between the R—Fe—B-based rare earth magnet layers, wherein R represents one or more kind of rare earth element including Y, and wherein the R oxide layers contain an R-rich alloy phase which contains 50 atomic % or more of R in a grain boundary and R oxide particles.

10. The rare earth magnet according to claim 9, wherein R of the R oxide layer contained in the composite layer is one or more selected from the group consisting of Y, Gd, Tb, Dy, Ho, Er, Tm, Yb, and Lu.

11. The rare earth magnet according to claim 9, wherein the R—Fe—B-based rare earth magnet layer has a composition such as 5 to 20 atomic % of R and 3 to 20 atomic % of B, with the balance consisting of Fe and inevitable impurities.

12. The rare earth magnet according to claim 9, wherein the R—Fe—B-based rare earth magnet layer has a composition such as 5 to 20 atomic % of R, 3 to 20 atomic % of B, and 0.001 to 5 atomic % of M, wherein M represents one or more selected from the group consisting of Ga, Zr, Nb. Mo, Hf, Ta, W, Ni, Al, Ti, V, Cu, Cr, Ge, C, and Si. with the balance consisting of Fe and inevitable impurities.

13. The rare earth magnet according to claim 9, wherein the R—Fe—B-based rare earth magnet layer has a composition such as 5 to 20 atomic % of R, 0.1 to 50 atomic % of Co, and 3 to 20 atomic % of B, with the balance consisting of Fe and inevitable impurities.

14. The rare earth magnet according to claim 9, wherein the R—Fe—B-based rare earth magnet layer has a composition such as 5 to 20 atomic % of R, 0.1 to 50 atomic % of Co, 3 to 20 atomic % of B, and 0.001 to 5 atomic % of M, wherein M represents one or more selected from the group consisting of Ga, Zr, Nb, Mo, Hf, Ta, W, Ni, Al, Ti, V, Cu, Cr, Ge, C, and. Si, with the balance consisting of Fe and inevitable impurities.

15. The R—Fe—B-based rare earth magnet, wherein the R—Fe—B-based rare earth magnet layer according to claim 9 is a magnetically anisotropic HDDR magnetic layer having a recrystallization texture comprising adjoining recrystallized grains containing an $R_2Fe_{14}B$ type intermetallic compound phase of a substantially tetragonal structure as a main phase, while the recrystallization texture has a fundamental structure having a constitution such that 50% by volume or more of the recrystallized grains have a shape such that a ratio b/a of the minimum grain size a and the maximum grain size b of the recrystallized grain is less than 2, and the average size of the recrystallized grains is in a range from 0.05 to 5 μm.

16. The rare earth magnet according to claim 9, wherein the rare earth magnet is formed by forming a R—Fe—B-based rare earth magnet powder green compact layer using an R—Fe—B-based rare earth magnet powder in magnetic field; forming a sputtered layer of oxide of rare earth element on the upper surface of the R—Fe—B-based rare earth magnet powder green compact layer so as to make at least two stacked bodies constituted from the R—Fe—B-based rare earth magnet powder green compact layer and the R oxide layer; placing one of the stacked bodies on another one of the stacked bodies so as to provide the glass powder layer between the R oxide layers, thereby to form a stacked green compact constituted from the R—Fe—B-based rare earth magnet powder green compact layer, the R oxide layer, the glass powder layer, the R oxide layer, and the R—Fe—B-based rare earth magnet powder green compact layer in order; and conducting a hot pressing of the stacked green compact to obtain the rare earth magnet.

* * * * *